US009635253B2

(12) United States Patent
Brady et al.

(10) Patent No.: US 9,635,253 B2
(45) Date of Patent: Apr. 25, 2017

(54) MULTISCALE TELESCOPIC IMAGING SYSTEM

(71) Applicant: Duke University, Durham, NC (US)

(72) Inventors: David Jones Brady, Durham, NC (US); Jungsang Kim, Chapel Hill, NC (US); Daniel Marks, Durham, NC (US); Hui Seong Son, Durham, NC (US)

(73) Assignee: Duke University, Durham, NC (US)

( * ) Notice: Subject to any disclaimer, the term of this patent is extended or adjusted under 35 U.S.C. 154(b) by 588 days.

(21) Appl. No.: 14/068,708

(22) Filed: Oct. 31, 2013

(65) Prior Publication Data

US 2014/0176710 A1    Jun. 26, 2014

Related U.S. Application Data

(63) Continuation-in-part of application No. 13/889,007, filed on May 7, 2013, now Pat. No. 9,432,591, which
(Continued)

(51) Int. Cl.
*H04N 13/02* (2006.01)
*H04N 5/232* (2006.01)
(Continued)

(52) U.S. Cl.
CPC ......... *H04N 5/23238* (2013.01); *G02B 23/12* (2013.01); *G02B 27/0025* (2013.01);
(Continued)

(58) Field of Classification Search
CPC .... G02B 13/06; G02B 23/12; G02B 27/0024; G03B 37/04; H04N 5/2254; H04N 5/23212; H04N 5/23238; H04N 5/2624
See application file for complete search history.

(56) References Cited

U.S. PATENT DOCUMENTS 3,669,527 A    6/1972 Fuller
4,184,749 A    1/1980 Grossman
(Continued)

FOREIGN PATENT DOCUMENTS

EP    0809124 A3    7/1998
EP    0893915 A2    1/1999
(Continued)

OTHER PUBLICATIONS

Lam, Edmund Y., "Compact and Thin Multi-lens System for Machine Vision Applications", "Image Processing: Machine Vision Applications", 2008, vol. 6813, Publisher: SPIE-IS&T Electronic Imaging.
(Continued)

*Primary Examiner* — Nhon Diep
(74) *Attorney, Agent, or Firm* — Kaplan Breyer Schwarz & Ottesen, LLP

(57) ABSTRACT

A multiscale telescopic imaging system is disclosed. The system includes an objective lens, having a wide field of view, which forms an intermediate image of a scene at a substantially spherical image surface. A plurality of microcameras in a microcamera array relay image portions of the intermediate image onto their respective focal-plane arrays, while simultaneously correcting at least one localized aberration in their respective image portions. The microcameras in the microcamera array are arranged such that the fields of view of adjacent microcameras overlap enabling field points of the intermediate image to be relayed by multiple microcameras. The microcamera array and objective lens are arranged such that light from the scene can reach the objective lens while mitigating deleterious effects such as obscuration and vignetting.

12 Claims, 35 Drawing Sheets

Related U.S. Application Data is a continuation-in-part of application No. 13/095,407, filed on Apr. 27, 2011, now Pat. No. 8,830,377, which is a continuation-in-part of application No. 12/651,894, filed on Jan. 4, 2010, now Pat. No. 8,259,212.

(60) Provisional application No. 61/142,499, filed on Jan. 5, 2009, provisional application No. 61/720,469, filed on Oct. 31, 2012, provisional application No. 61/774,910, filed on Mar. 8, 2013.

(51) Int. Cl.

| | | |
|---|---|---|
| *G02B 27/00* | (2006.01) | |
| *H04N 5/225* | (2006.01) | |
| *H04N 5/262* | (2006.01) | |
| *G02B 23/12* | (2006.01) | |
| *G02B 13/06* | (2006.01) | |
| *G03B 37/04* | (2006.01) | |

(52) U.S. Cl.
CPC ....... *H04N 5/2254* (2013.01); *H04N 5/23212* (2013.01); *H04N 5/2624* (2013.01); *G02B 13/06* (2013.01); *G03B 37/04* (2013.01)

(56) References Cited

U.S. PATENT DOCUMENTS

| | | | |
|---|---|---|---|
| 4,323,925 A | 4/1982 | Abell et al. | |
| 5,004,328 A | 4/1991 | Suzuki et al. | |
| 5,012,081 A * | 4/1991 | Jungwirth | G01S 3/7867 250/203.6 |
| 5,161,062 A | 11/1992 | Shafer et al. | |
| 5,311,611 A | 5/1994 | Mlgliaccio | |
| 6,002,743 A * | 12/1999 | Telymonde | G06T 1/0007 348/E3.032 |
| 6,097,545 A | 8/2000 | Vaughan | |
| 6,097,551 A | 8/2000 | Kreitzer | |
| 6,137,535 A | 10/2000 | Meyers | |
| 6,320,703 B1 | 11/2001 | Chen et al. | |
| 6,339,506 B1 | 1/2002 | Wakelin et al. | |
| 6,556,349 B2 | 4/2003 | Cox et al. | |
| 6,874,420 B2 * | 4/2005 | Lewis, Jr. | B41F 33/0081 101/181 |
| 7,123,777 B2 | 10/2006 | Rondinelli et al. | |
| 7,499,094 B2 | 3/2009 | Kuriyama | |
| 7,728,901 B2 | 6/2010 | Onozawa et al. | |
| 8,049,806 B2 | 11/2011 | Feldman et al. | |
| 8,259,212 B2 | 9/2012 | Brady et al. | |
| 8,830,377 B2 | 9/2014 | Marks et al. | |
| 8,991,270 B2 * | 3/2015 | Stallinga | G01N 15/0625 73/863.02 |
| 9,198,578 B2 * | 12/2015 | Zuzak | A61B 5/0071 |
| 9,256,056 B2 | 2/2016 | Marks et al. | |
| 9,395,617 B2 | 7/2016 | McCain et al. | |
| 9,482,850 B2 * | 11/2016 | Ford | F24J 2/08 |
| 2003/0106208 A1 | 6/2003 | Hosier et al. | |
| 2003/0231255 A1 | 12/2003 | Szajewski et al. | |
| 2004/0061787 A1 | 4/2004 | Liu et al. | |
| 2004/0212882 A1 | 10/2004 | Liang et al. | |
| 2004/0223071 A1 | 11/2004 | Wells et al. | |
| 2004/0257460 A1 | 12/2004 | Kuriyama | |
| 2005/0052751 A1 | 3/2005 | Liu et al. | |
| 2005/0109918 A1 | 5/2005 | Nikzad et al. | |
| 2005/0174643 A1 | 8/2005 | Lee et al. | |
| 2006/0054782 A1 | 3/2006 | Olsen et al. | |
| 2006/0055811 A1 | 3/2006 | Fritz et al. | |
| 2006/0209292 A1 | 9/2006 | Dowski, Jr. et al. | |
| 2007/0109438 A1 | 5/2007 | Duparre et al. | |
| 2007/0200946 A1 | 8/2007 | Onozawa et al. | |
| 2007/0252074 A1 | 11/2007 | Ng et al. | |
| 2008/0080066 A1 | 4/2008 | Saito | |
| 2008/0123205 A1 | 5/2008 | Nakano et al. | |
| 2009/0140131 A1 | 6/2009 | Utagawa | |
| 2009/0303595 A1 | 12/2009 | Lim et al. | |
| 2010/0103300 A1 | 4/2010 | Jones et al. | |
| 2010/0171866 A1 | 7/2010 | Brad et al. | |
| 2010/0264502 A1 | 10/2010 | Christophersen et al. | |
| 2011/0211106 A1 | 9/2011 | Marks et al. | |
| 2011/0268868 A1 | 11/2011 | Dowski, Jr. et al. | |
| 2013/0076900 A1 | 3/2013 | Mrozek et al. | |
| 2013/0242060 A1 | 9/2013 | Brady et al. | |
| 2014/0139623 A1 | 5/2014 | McCain et al. | |
| 2014/0176710 A1 | 6/2014 | Brady et al. | |
| 2014/0192254 A1 | 7/2014 | Marks et al. | |
| 2014/0320708 A1 | 10/2014 | Marks et al. | |
| 2015/0085179 A1 * | 3/2015 | Van Heugten | H04N 5/23212 348/349 |
| 2015/0207990 A1 * | 7/2015 | Ford | H04N 5/2254 348/262 |
| 2016/0142646 A1 | 5/2016 | Marks et al. | |

FOREIGN PATENT DOCUMENTS

| | | |
|---|---|---|
| JP | S-6381413 A | 4/1988 |
| JP | H04196689 A | 7/1992 |
| JP | H-05226218 A | 9/1993 |
| JP | 035999 A | 2/1995 |
| JP | H-09509265 A | 9/1997 |
| JP | 2001-005054 A | 1/2001 |
| JP | 2003-283932 A | 10/2003 |
| JP | 2001-151718 A | 5/2004 |
| JP | 2004526300 A | 8/2004 |
| JP | 2005045141 | 2/2005 |
| JP | 2005136325 A | 5/2005 |
| JP | 2007-004471 A | 1/2007 |
| WO | 9523349 A1 | 8/1995 |
| WO | 9926419 A1 | 5/1999 |

OTHER PUBLICATIONS

Duparre et al., "Microoptical telescope compound eye", "Optics Express", Feb. 7, 2005, vol. 13, No. 3, Publisher: Optical Society of America, Published in: US.

Christensen et al., "Multiscale Optical Design for Global Chip-to-Chip Optical Interconnections and Misalignment Tolerant Packaging", "IEEE Journal on Selected Topics in Quantum Electronics", Mar./Apr. 2003, vol. 9, No. 2, Publisher: IEEE.

Duparre et al., "Thin compound-eye camera", "Applied Optics XP-002578598", 2005, vol. 44, No. 15, Publisher: Optical Society of America, Published in: US.

"Related Japanese Patent Application No. JP 2011-544647", "Office Action", Dec. 3, 2013, Publisher: JPO, Published in: JP.

Hiroshima, "Related Japanese Patent Application No. JP2011-544647 Office Action", Dec. 11, 2012, Publisher: JPO, Published in: JP.

Hylla, Winfried, "PCT Application No. PCT/US2010/020077 International Preliminary Report on Patentability Mar. 31, 2011", , Publisher: PCT, Published in: PCT.

Hylla, Winfried, "PCT Application No. PCT/US2010/020077 International Search Report May 4, 2010", , Publisher: PCT, Published in: PCT.

J. S. Chahl and M. V. Srinivasan, "Reflective surfaces for panoramic imaging", "Applied Optics", Nov. 1, 1997, pp. 8275-8285, vol. 36, No. 31, Publisher: Optical Society of America, Published in: AU.

Quertemont, Eric, "PCT Application No. PCT/US2011/034156 International Search Report Sep. 23, 2011", , Publisher: PCT, Published in: PCT.

Tissire, Abdelaaziz, "Related U.S. Appl. No. 13/095,407 Office Action", Mar. 15, 2013, Publisher: USPTO, Published in: US.

Daniel L. Marks, "Close-up Imaging Using Microcamera Arrays for Focal Plan Synthesis", "2011 SPIE", Mar. 2011, pp. 1-9, vol. 50, No. 3, Publisher: Optical Engineering.

David J. Brady et al, "Multiscale lens design", Jun. 10, 2009, pp. 10659-10674, vol. 17, No. 13, Publisher: Optics Express.

David J. Brady, "Focus in Multiscale Imaging Systems", "Imaging and Applied Optics Technical Digest", 2012, Publisher: Duke Imaging and Spectroscopy Program, ECE Department, Published in: US.

(56) References Cited

OTHER PUBLICATIONS

Brady, et al., "Gigapixel Photography Supplementary Information", "nature11150", , pp. 1-30, Publisher: www.Nature.com/Nature, Published in: US.

Brady, et al., "Multiscale gigapixel photography", "nature11150", Jun. 21, 2012, pp. 386-389, vol. 486, Publisher: Macmillan Publishers Limited, Published in: US.

David J. Brady, "Multiscale Optical Systems", "Optical Society of America", 2009, Publisher: Duke University Fitzpatrick Institute for Photonics, Department of Electrical & Computer Engineering, Published in: US.

Brady, et al., "Petapixel Photography and the Limits of Camera Information Capacity", "Computational Imaging XI", 2013, vol. 8657, 86570B, Publisher: Department of Electrical and Computer Engineering, Duke University, Published in: US.

Golish, et al., "Challenges in gigapixel multiscale image formation", "Imaging and Applied Optics Technical Digest", 2012, Publisher: Department of Electrical and Computer Engineering, University of Arizona, Published in: US.

Golish, et al., "Image formation in multiscale optical systems", "Imaging and Applied Optics Technical Digest", 2011, Published in: US.

D.R. Golish et al, "Development of a scalable image formation pipeline for multiscale gigapixel photography", Sep. 24, 2012, pp. 22048-22062, vol. 20, No. 20, Publisher: Optics Express.

Hagen, et al., "Aberration correction in multiscale lenses", "OSA/FiO/LS/AO/AIOM/COSI/LM/SRS 2009", 2009, Publisher: Optical Society of America, Published in: US.

Kittle, et al., "Automated calibration and optical testing of the AWARE-2 gigapixel multiscale camera", "Digital Photography IX", 2013, vol. 8660, 866006, Publisher: Electrical and Computer Engineering, Duke University, Published in: US.

Daniel L. Marks et al, "Microcamera aperture scale in monocentric gigapixel cameras", Oct. 20, 2011, pp. 5824-5833, vol. 50, No. 30, Publisher: Applied Optics.

Daniel L. Marks, "Gigagon: a Monocentric Lens Design Imaging 40 Gigapixels", , Publisher: Optical Society of America.

Daniel L. Marks et al, "Gigapixel Imaging with the AWARE Multiscale Camera", , p. 31 Publisher: Optics & Photonics News.

Daniel L. Marks, "A common scalable microcamera design for 2, 10, and 40 gigapixel class multiscale cameras", , Publisher: Technical Digest.

Daniel L. Marks et al, "Engineering a gigapixel monocentric multiscale camera", Aug. 7, 2012, pp. 1-13, vol. 51, No. 8, Publisher: Optical Engineering.

Daniel L. Marks, "Optical Testing of the AWARE Wide Field 2-Gigapixel Multiscale Camera", Sep. 30, 2011, pp. 1-2, Publisher: Technical Digest.

Marks, et al., "Optimizing microcamera aperture in gigapixel monocentric multiscale cameras", "Imaging and Applied Optics Technical Digest", 2011, Published in: US.

Marks, et al., "Wide-Field Microscopy using Microcamera Arrays", "Three-Dimensional and Multidimensional Microscopy: Image Acquisition and Processing XX,", , vol. 8589 85890Z-1, Publisher: aDuke University, Department of Electrical and Computer Engineering, Published in: US.

Son, et al., "A Multiscale, Wide Field, Gigapixel Camera", "Imaging and Applied Optics Technical Digest", 2011, Published in: US.

Hui S. Son et al, "Design of a spherical focal surface using closepacked relay optics", Aug. 15, 2011, pp. 16132-16138, vol. 19, No. 17, Publisher: Optics Express.

Eric J. Tremblay et al, "Design and scaling of monocentric multiscale imagers", "Applied Optics", Jul. 10, 2012, pp. 4691-4702, vol. 51, No. 20, Publisher: Optical Society of America.

Kelly J. Jerabek, "U.S. Appl. No. 12/651,894 Office Action", Mar. 14, 2012, Publisher: USPTO, Published in: US.

Hui S. Son et al, "Optomechanical design of multiscale gigapixel digital camera", "Applied Optics", Mar. 10, 2013, pp. 1541-1549, vol. 52, No. 8, Publisher: Optical Society of America.

"Final Office Action issued in related U.S. Appl. No. 13/740,021, dated Jan. 29, 2016".

"Notice of Allowance issued in in related Japanese Application No. 2013-508216 on Jan. 12, 2016".

"Non Final Office Action issued in related U.S. Appl. No. 14/185,364, dated Feb. 8, 2016".

"Related U.S. Appl. No. 13/095,407", "Non-Final Office Action", Feb. 19, 2014, Publisher: USPTO, Published in: US.

"Final Office Action" Dated Mar. 25, 2016 in Related U.S. Appl. No. 13/889,007.

"First Office Action", issued in related EP Patent Application No. 10 701 047.2, dated Aug. 3, 2015.

"Office Action", issued in counterpart Japanese patent application No. 2011-544647, dated Sep. 3, 2014.

"NonFinal Offfice Action", issued in U.S. Appl. No. 13/740,021 dated Jun. 24, 2015.

"Office Action", issued in counterpart Japanese patent application No. 2013-508216, dated Mar. 19, 2015.

"Final Office Action", issued in co-pending U.S. Appl. No. 14/313,233, dated Jul. 1, 2015.

"Notice of Allowance" dated Jun. 21, 2016 in related U.S. Appl. No. 13/889,007.

"Notice of Allowance" dated Aug. 3, 2016 in related U.S. Appl. No. 14/185,364.

"Office Action", dated Oct. 29, 2015; issued in JP Application No. JP 2011-544647, Published in: JP.

"Non Final Office Action" dated Oct. 5, 2015; issued in related U.S. Appl. No. 13/889,007.

"Notice of Allowance"; issued on Oct. 2, 2015, in related U.S. Appl. No. 14/313,233.

\* cited by examiner

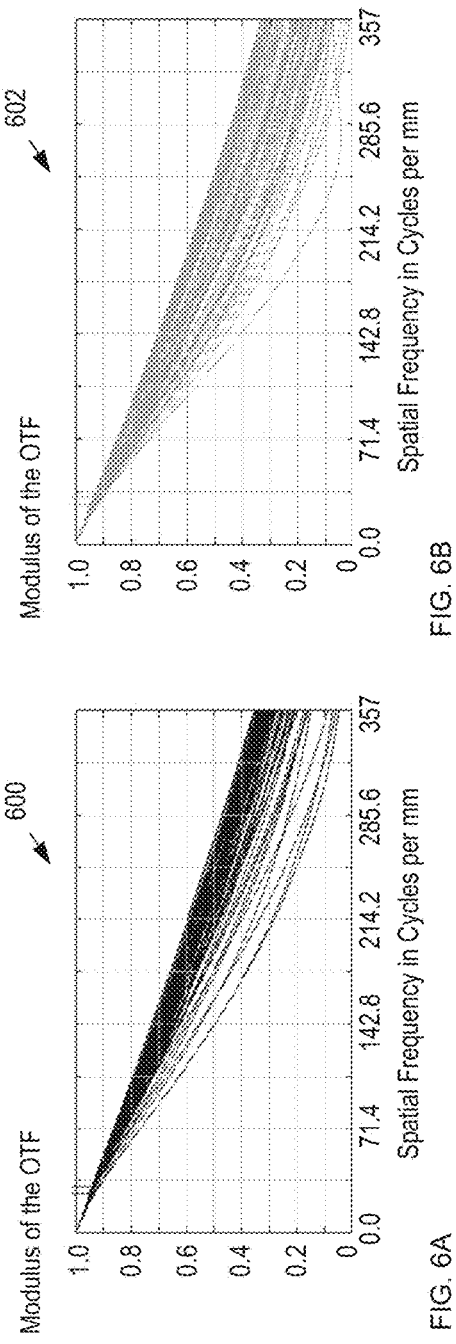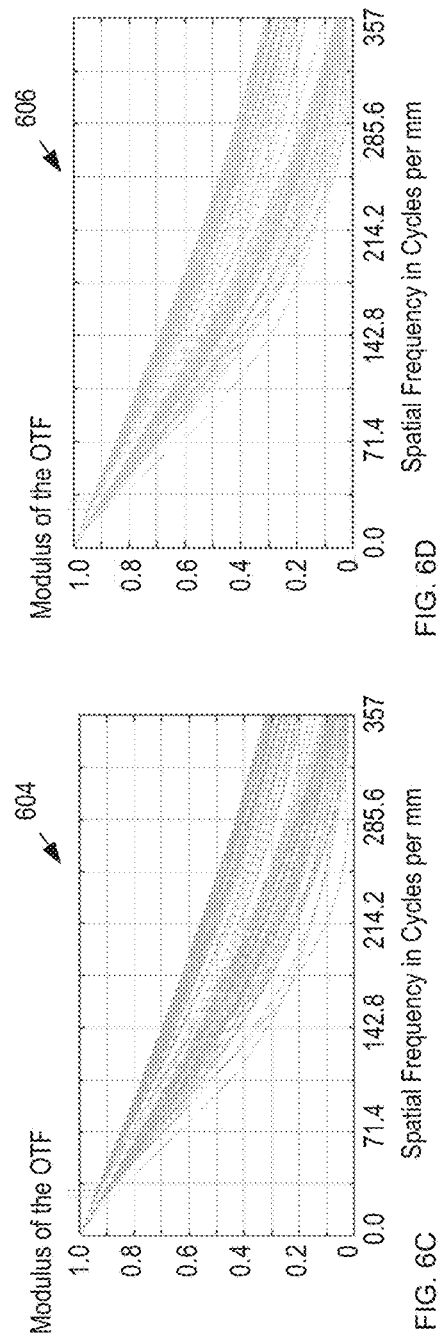
FIG. 6A
FIG. 6B
FIG. 6C
FIG. 6D

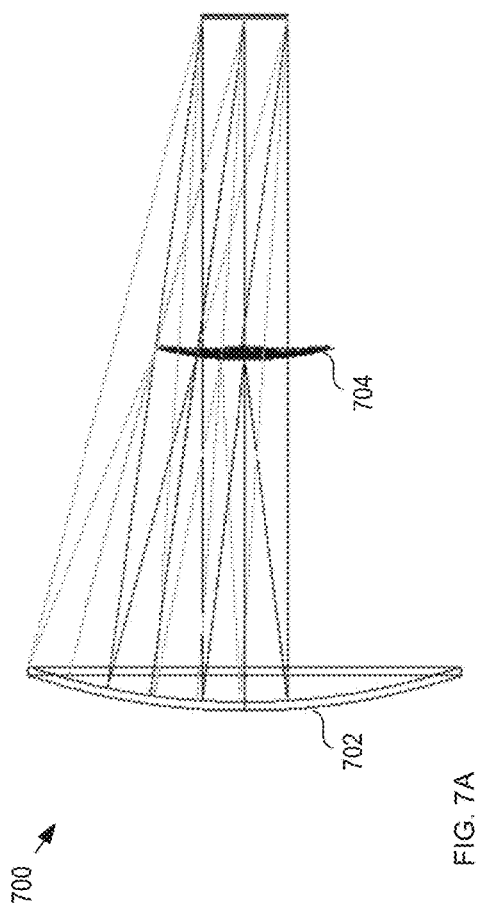
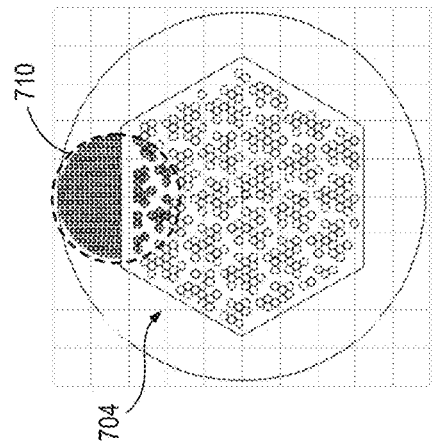
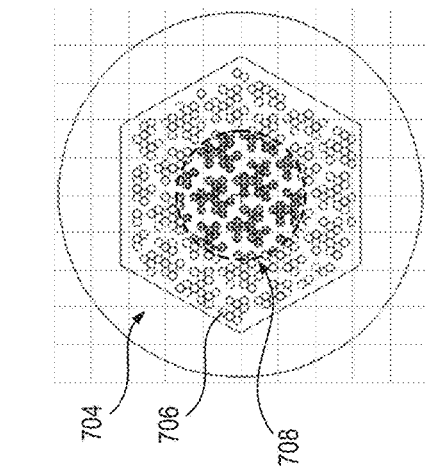
FIG. 7A
FIG. 7B
FIG. 7C

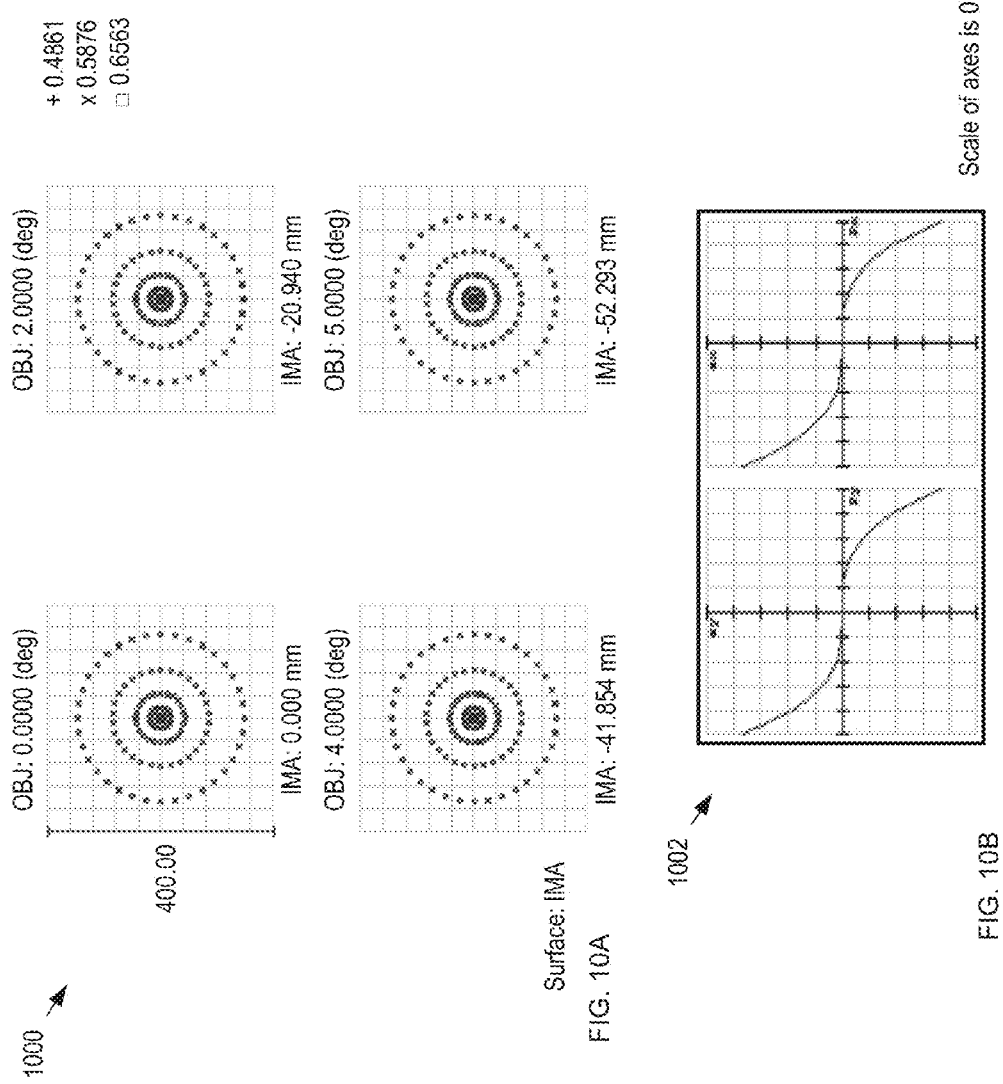

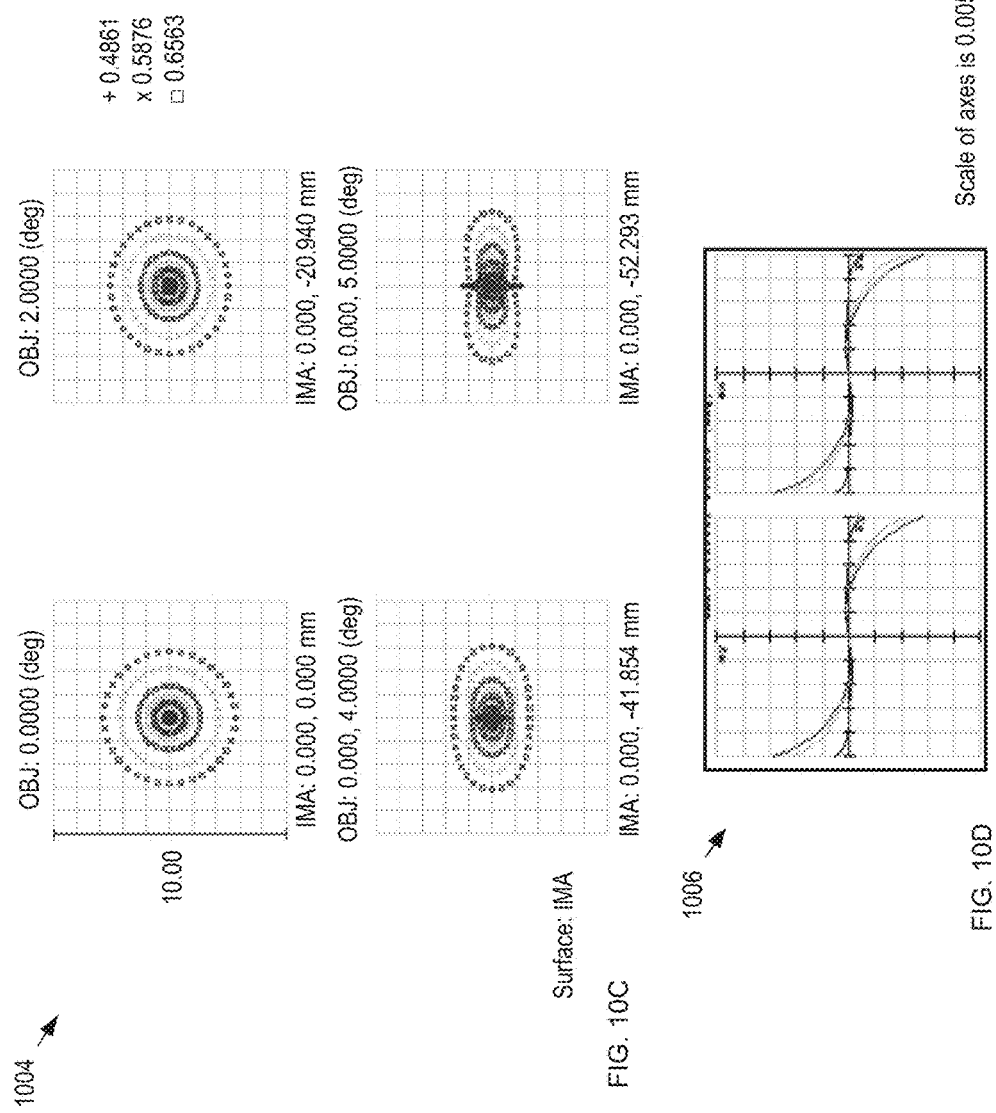

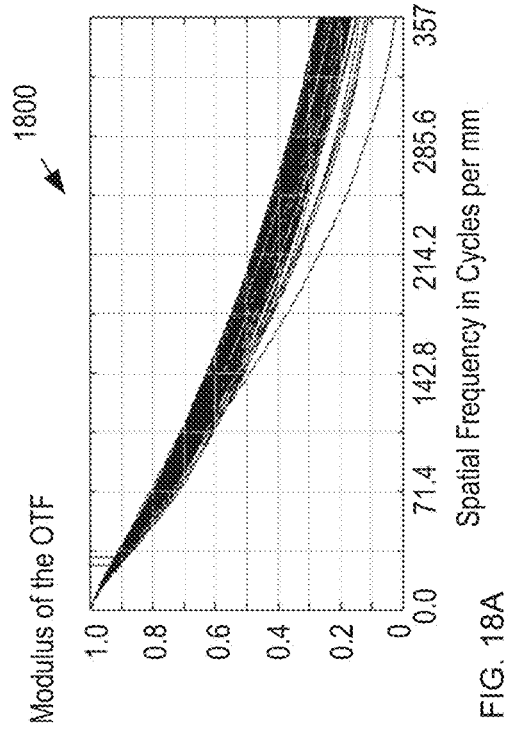

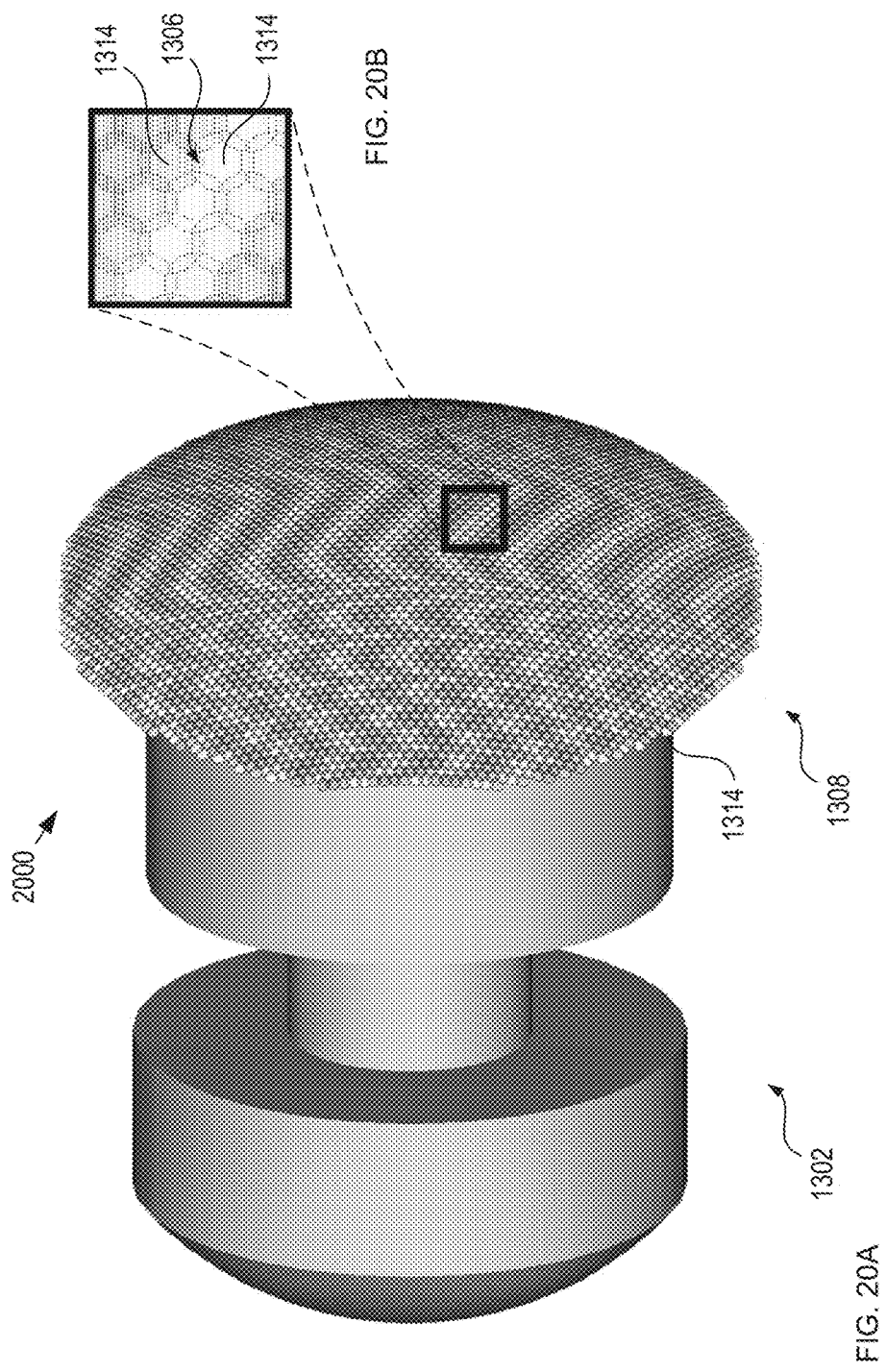

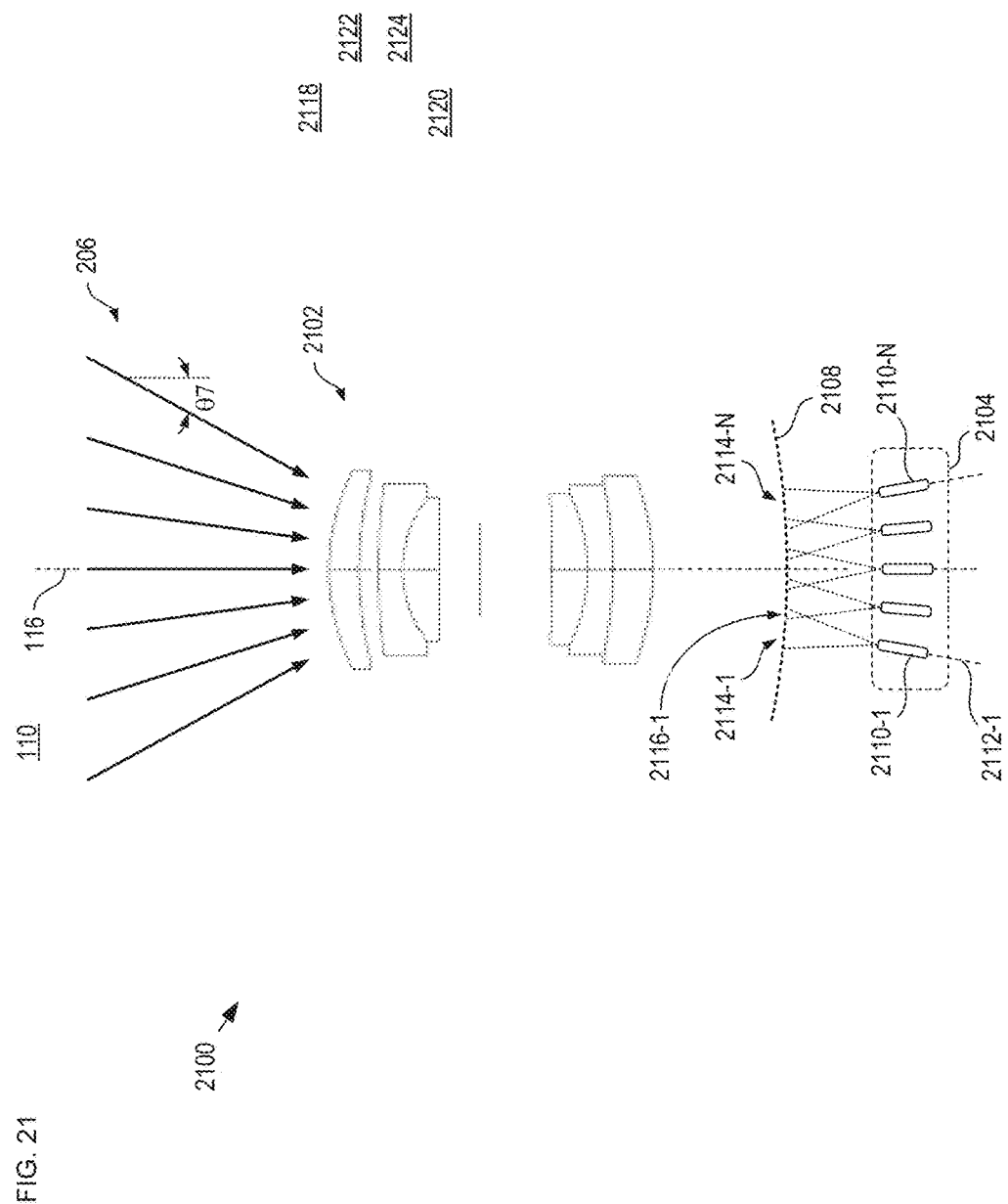

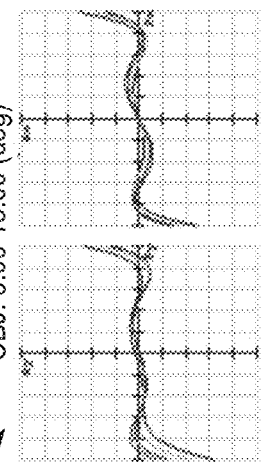
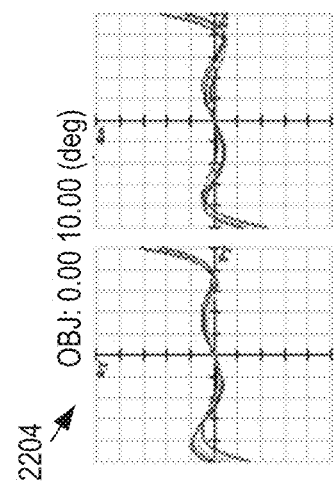
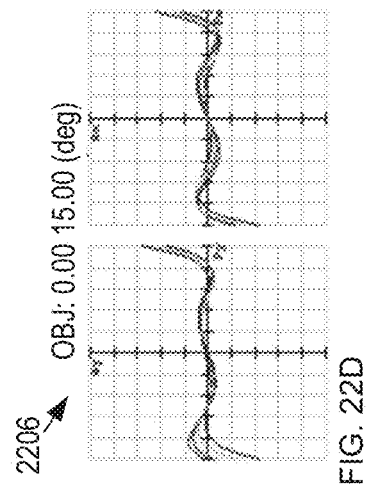
FIG. 22A  FIG. 22B  FIG. 22C  FIG. 22D  FIG. 22E

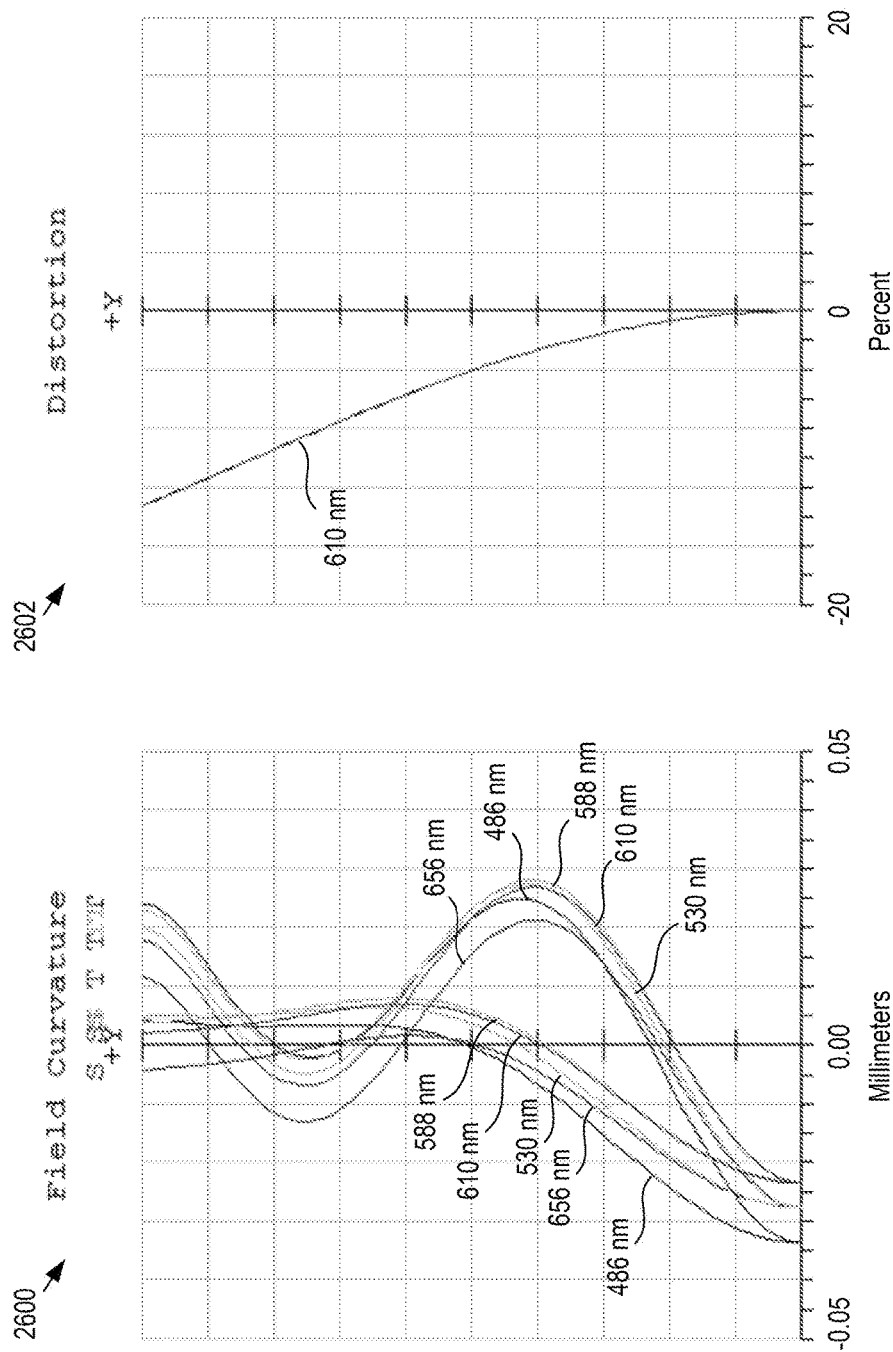

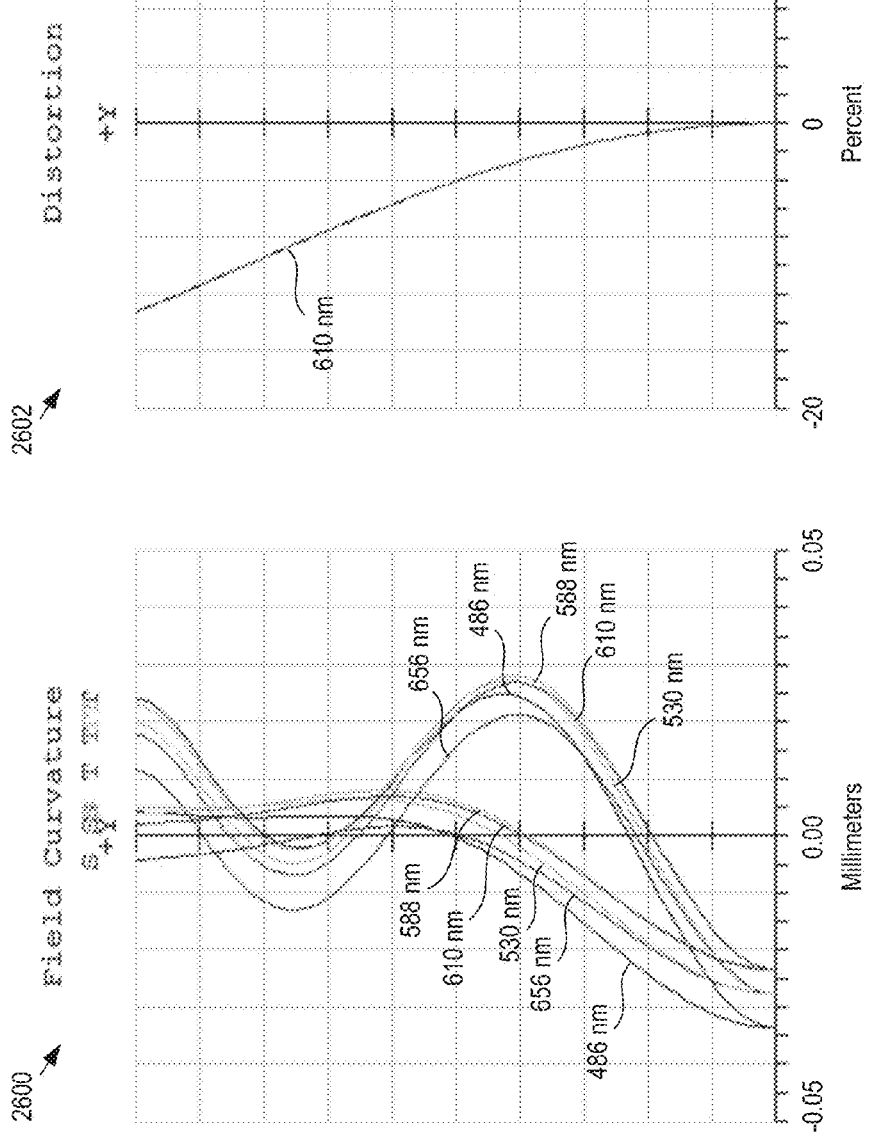

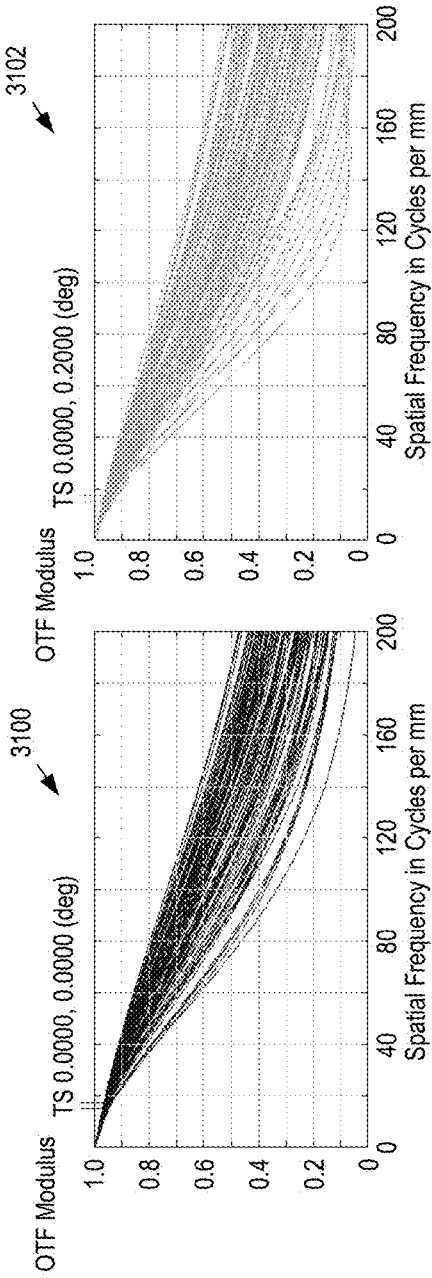
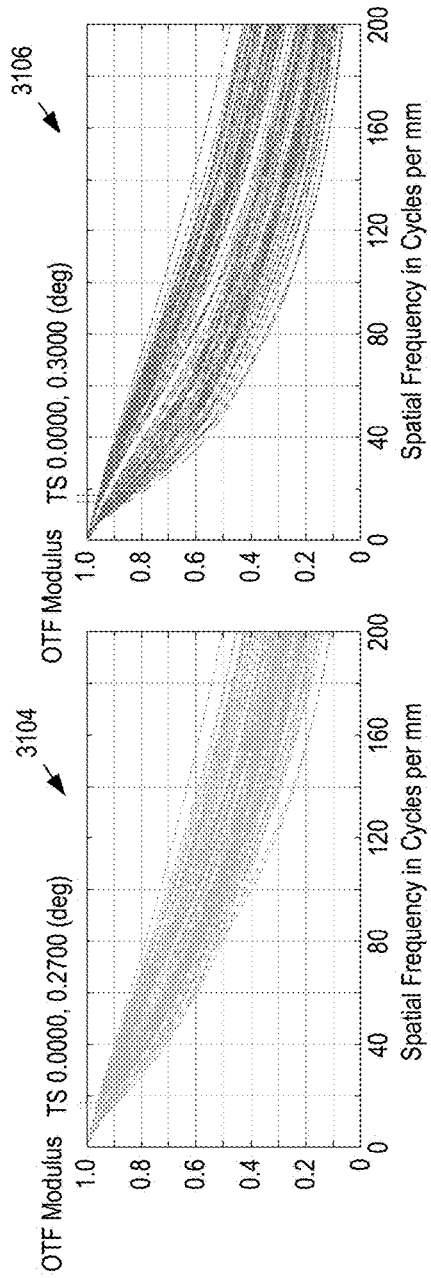
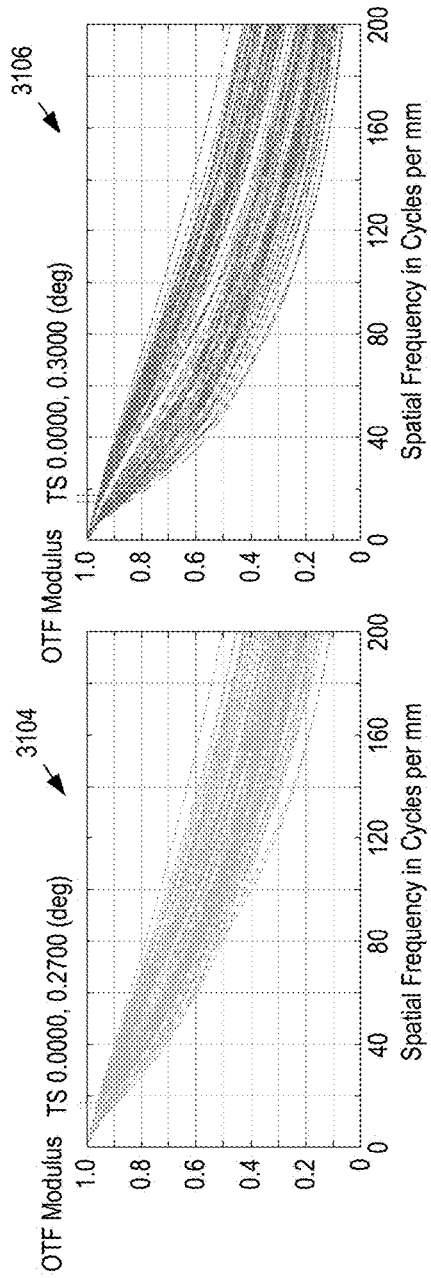
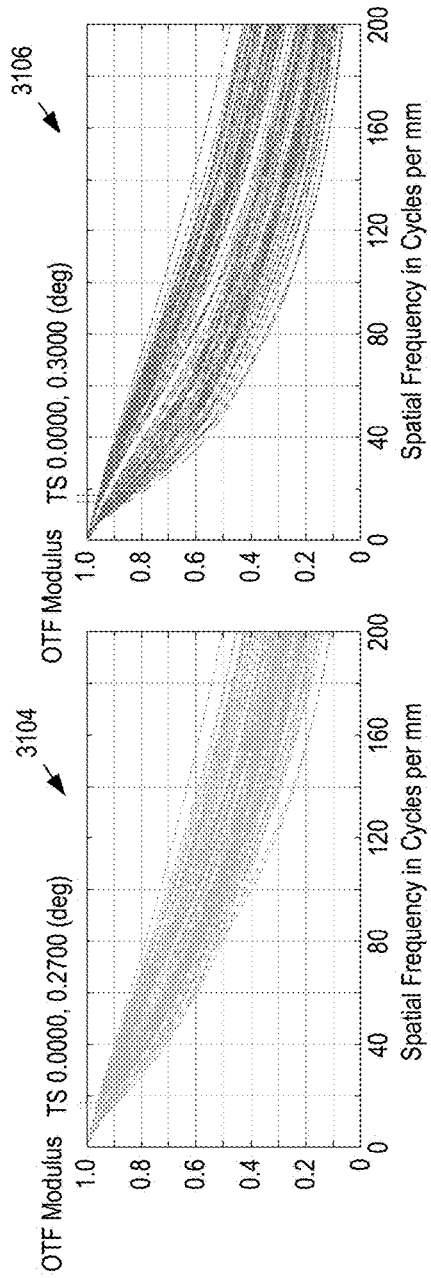
FIG. 31A
FIG. 31B
FIG. 31C
FIG. 31D

MULTISCALE TELESCOPIC IMAGING SYSTEM

CROSS REFERENCE TO RELATED APPLICATIONS

This case is a continuation-in-part of co-pending U.S. patent application Ser. No. 13/889,007, filed May 7, 2013, which is a continuation-in-part of U.S. patent application Ser. No. 13/095,407 filed Apr. 27, 2011, which is a continuation-in-part of U.S. patent application Ser. No. 12/651,894, filed 4 Jan. 2010, which claims priority of U.S. Provisional Patent Application 61/142,499, filed Jan. 5, 2009, each of which is incorporated herein by reference.

This application also claims priority of provisional patent applications U.S. Ser. No. 61/720,469, filed Oct. 31, 2012 and U.S. Ser. No. 61/774,910, filed Mar. 8, 2013, each of which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY-SPONSORED RESEARCH

This invention was made with Government support under HR-0011-10C-0073 awarded by the Defense Advanced Research Projects Agency (DARPA). The Government has certain rights in the invention.

FIELD OF THE INVENTION

The present invention relates to imaging optics in general, and, more particularly, to wide field of view imaging systems.

BACKGROUND OF THE INVENTION

Telescopic imaging systems are widely used for imaging scenes through the Earth's atmosphere-ground-based telescopes for astronomical observation and space-based telescopes for aerial surveillance of regions of the Earth's surface. The goal of a typical telescopic imaging system, such as an astronomical telescope, is to achieve an image resolution at the limit permissible by scintillation while imaging the largest solid angle permissible by atmospheric seeing considerations.

A conventional telescopic imaging system includes a long-focal-length objective lens or mirror and a short-focal-length relay lens (i.e., eyepiece). Over time, successively larger aperture telescopes have been developed to improve telescope performance.

Unfortunately, turbulent mixing (caused by effects such as different temperature layers, wind speeds, etc.) can perturb the optical refractive index of the Earth's atmosphere. As a result, as light waves travel through the atmosphere, they can become distorted, leading to image distortions (e.g., aberrations, speckle, etc.) that manifest as optical effects like the blurring and twinkling of stars when viewed from the Earths' surface. They can also lead to impaired image resolution for space-based imaging systems used for aerial surveillance.

Atmospheric perturbation is quantified by the diameter of the "seeing disc," which is a measure of how severely atmospheric perturbation affects imaging capability. The seeing disc corresponds to the diameter of a blurred image that results from observation of a point-source object through the atmosphere. Theoretically, the seeing limit through the Earth's atmosphere is of order 1 arcsecond (~0.4 arcseconds has been achieved at high-altitude observatories on small islands such as Mauna Kea or La Palma) without the inclusion of expensive adaptive optics approaches to actively correct for aberrations.

The diameter of the objective lens determines the aperture of the imaging system, which, in turn, determines the brightness and sharpness with which a telescope can image a scene. Image detail (i.e., resolution) and the amount of light captured scale with objective-lens aperture. In other words, telescopic imaging systems having larger apertures enable more image detail and fainter objects to be observed. Unfortunately, a larger aperture lens also results in a larger difference in the optical path of light that travels through the lens on the optical axis from the optical path of light that travels through the lens off the optical axis. Larger aperture lenses, therefore, induce greater aberrations on the light passing them. As a result, complex system designs that include adaptive optics, speckle masking, additional optical surfaces, and/or other atmospheric distortion compensation, are required to achieve diffraction-limited performance making larger such systems more expensive to fabricate.

It is known that restricting the field of view of a large-aperture telescope can provide lower-aberration performance, however. Such an approach has been taken with several such systems that are in operation around the world, such as the 2.5-meter (m) telescope located at Apache Point Observatory, New Mexico. This telescope, used in the Sloan Digital Sky Survey, is equipped with a 120-megapixel camera and, although considered a "wide-field" telescope, has an instantaneous field of view that is limited to approximately 1.5 square degrees of sky. As a result, while this telescope can capture multi-color images of over one-quarter of the sky, these images are obtained over an extremely long period of time due, in part, to the fact that its instantaneous field of view is approximately equal to about eight times the diameter of the full moon. In similar fashion, the "wide-field," high-resolution ARGUS-IS telescope, includes a restricted instantaneous field of view of approximately 5 arcseconds and a total 45° field of view.

Unfortunately, such prior-art telescopic imaging systems cannot provide high-resolution images over a large instantaneous field of view. This leads to large regions of a scene being unobserved at any given time. As a result, transient events, such as passage of satellites or space debris, super novas, etc., often remain unobserved.

A cost-efficient, high-resolution telescopic imaging system that has a wide instantaneous-field of view, therefore, remains unrealized in the prior art.

SUMMARY OF THE INVENTION

The present invention enables telescopic imaging systems having large fields-of-view and high image resolution without some of the costs and disadvantages of the prior art. Embodiments of the present invention are particularly well suited for use in astronomical observation systems and aerial surveillance systems.

An illustrative embodiment of the present invention is a multiscale telescopic imaging system comprising a monocentric reflective objective lens and an array of microcameras. The objective lens images a scene onto a spherical intermediate image surface. Each microcamera in the microcamera array relays an image portion of the intermediate image onto its respective focal-plane array while simultaneously correcting at least one localized aberration in its image portion. The microcameras in the microcamera array are arranged such that the fields of view of adjacent microcameras overlap enabling field points of the intermediate image to be relayed by multiple microcameras. As a result, a contiguous portion of the intermediate image is relayed, yet the camera array enables light from the scene to transit the array and reach the objective lens. This mitigates obscuration and vignetting that commonly plague conventional reflective imaging systems.

In some embodiments, the objective lens is a monocentric reflective lens that includes a Schmidt corrector plate.

In some embodiments, the objective lens is a monocentric refractive lens.

In some embodiments, the objective lens is a refractive lens based on a Double Gauss lens design.

An embodiment of the present invention is a multiscale telescopic imaging system comprising: an objective lens operative for forming an intermediate image of a scene, the intermediate image being characterized by a first localized aberration; and a plurality of microcameras, each microcamera comprising secondary optics and a focal plane array, the secondary optics being operative for relaying an image portion of the intermediate image onto the focal plane array, wherein each microcamera is operative for reducing the magnitude of the first localized aberration; wherein the system has a field of view that is equal to or greater than 10 degrees, and wherein the system has resolution equal to or less than 2 arcseconds.

Another embodiment of the present invention is a multiscale telescopic imaging system comprising: an objective lens, the objective lens being operative for forming a first image of a scene at a first image surface; and a plurality of microcameras, each microcamera comprising a focal plane array, the plurality of microcameras being operative for relaying a plurality of image portions of the first image onto the plurality of focal plane arrays, wherein the plurality of microcameras is arranged in a first arrangement that enables the plurality of image portions to collectively define a continuous region of the image, and wherein at least one of the plurality of microcameras is operative for reducing the magnitude of a first localized aberration, and further wherein the first arrangement enables at least a partial overlap of a first image portion and a second image portion of the plurality of image portions.

Another embodiment of the present invention is a multiscale telescopic imaging system comprising: an objective lens, the objective lens being operative for forming a first image of a scene at a first image surface, and the objective lens including at least one reflective surface; and a plurality of microcameras, each microcamera being operative for reducing the magnitude of a first localized aberration, the plurality of microcameras being operative for forming a plurality of image portions of the first image, wherein the plurality of microcameras is arranged in a first arrangement of sub-groups, each sub-group comprising at least one microcamera, and wherein the sub-groups are arranged in a second arrangement that includes open space between at least two adjacent sub-groups.

BRIEF DESCRIPTION OF THE DRAWINGS

FIGS. 6A-D depict results of a Monte Carlo simulation of assembly tolerances for system 200.

FIG. 7A depicts a cross-sectional view of the modeled system.

FIG. 7B shows light rays for on-axis field 708.

FIG. 7C shows light rays of edge field 710.

FIGS. 10A-B depict spot diagrams and ray fans for system 200.

FIGS. 10C-D depict spot diagrams and ray fans for system 900.

FIGS. 18A-D depict Monte Carlo simulations of the performance of system 1300 under realistic manufacturing conditions.

FIG. 20A depicts a schematic drawing of a perspective view of an arrangement of a microcamera array in accordance with the second alternative embodiment of the present invention.

FIG. 20B depicts a detailed view of overlap fields 1316 formed by the overlap of adjacent image portions 1314.

FIG. 21 depicts a schematic drawing of a cross-sectional view of a multiscale telescopic imaging system in accordance with a third alternative embodiment of the present invention.

FIGS. 22A-E depicts ray fans for five field positions within intermediate image 2108.

FIGS. 26A and 26B depict the field curvature and distortion, respectively, of sub-image 2426-$i$ at focal plane array 2404.

FIGS. 31A-D depict Monte Carlo simulations of the performance of system 2800 under realistic manufacturing conditions.

DETAILED DESCRIPTION

Figure 1:
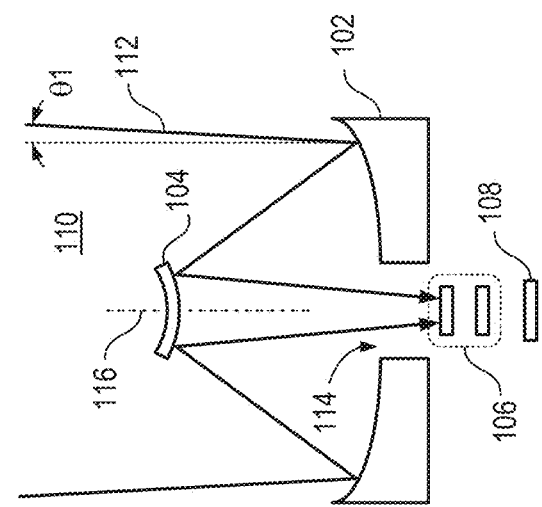
FIG. 1 depicts a schematic drawing of a cross-sectional view of a telescopic imaging system in accordance with the prior art.

FIG. 1 depicts a schematic drawing of a cross-sectional view of a telescopic imaging system in accordance with the prior art. Imager 100 comprises primary mirror 102, secondary mirror 104, focusing system 106, and focal plane array 108. Imager 100 forms an image of a portion of scene 110. Imager 100 is representative of restricted-view, large-aperture telescopes, such as the Sloan Digital Sky Survey telescope, designed to generate a map of the entire sky. Image 100 combines employs a wide aperture to enable astronomical surveys that include stellar and galactic objects, as well as near-earth objects (e.g., low-earth satellites, space debris, etc.).

Primary mirror 102 is a 2.5-m diameter concave mirror that includes hole 114. Primary mirror 102 has a substantially symmetric shape about axis of rotation 116. Mirror 102 receives light rays 112 from scene 110 and reflects them to secondary mirror 104.

Secondary mirror 104 is a 1.08-m diameter convex mirror having a substantially symmetric shape about axis of rotation 116. Secondary mirror 104 receives light rays 112 from primary mirror 110 and reflects them to focusing system 106 through hole 114.

Light rays 112 are received from secondary mirror 104 at focusing system 106, which forms an image on the surface of focal plane array 108.

Focal plane array 108 is conventional array of image sensors (e.g., CMOS sensors, CCD elements, infrared light photodetectors, etc.) that converts the received light into a digital representation of scene 110.

One skilled in the art will recognize that off-axis aberrations increase rapidly with field angle. Since primary mirror 102 and secondary mirror 104 must correct both on- and off-axis aberrations, including spherical aberration and coma, in order to mitigate the effects of off-axis aberrations, the instantaneous field of view of imager 100 is restricted to an included angle of 2*θ1. For imager 100, θ1 is limited to approximately 1.5 degrees, yielding an instantaneous field of view of approximately 3° over the approximately 4 m$^2$ collection area of the imager. As a result, the etendue of imager 100 (i.e., the area of the system aperture multiplied by the solid angle subtended, as seen from the aperture) is approximately 0.0086 Sr·m$^2$.

In comparison to other prior-art telescopic imaging systems, the three-degree field of view of imager 100 is quite large. For example, the Keck telescope, located at the summit of Mauna Kea in Hawaii, has an instantaneous field of view that is approximately 2 arcseconds by 8 arcseconds. For many applications, however, a field of view of three degrees is still insufficient since it restricts visibility to only a small portion of a scene at any one time, thereby precluding observation of transient events that occur outside of the instantaneous viewable region.

As discussed above, the goal of a telescopic imaging system is typically to achieve a resolution at the limit permissible by scintillation while imaging the largest solid angle permissible by atmospheric seeing considerations. It has been shown that, for a Fried parameter of $r_0$=10 cm, the minimum resolvable feature is 1 arcsecond for visible light. In order to achieve the desired resolution, the entrance pupil diameter of the camera is approximately the same size as the Fried parameter.

Monocentric objective lenses, in theory, promise the potential for large fields of view, since the field of view of a monocentric lens is limited only by vignetting. While monocentric reflective and catadioptric objective-based telescopic imaging systems have been demonstrated, it has proven difficult to achieve large fields of view in practice. Catadioptric telescopes have proven difficult to achromatize and usually require an objective mirror significantly larger than the entrance pupil. Refractive designs do not have this disadvantage; however, aperture obscuration in a reflective telescope can give rise vignetting, which increases at higher field angles. Further, chromatic aberrations in a very large refractive objective are considerable and can be difficult to correct.

The present invention, on the other hand, enables telescopic imaging systems having resolution nearly at the atmospheric limit with greatly increased instantaneous fields of view and smaller apertures. Embodiments of the present invention attain these characteristics by employing the multiscale imaging concept that is described in U.S. Pat. No. 8,259,212, which is incorporated herein by reference.

The Multiscale Imaging Approach

As disclosed in U.S. Pat. No. 8,259,212, a multiscale optical system comprises a single objective lens (which can be either a monocentric lens or a non-monocentric lens) and an array of microcameras, each of which includes a one or more lenses and a focal-plane array. The objective lens and the microcameras divide the task of imaging a scene. The objective forms an imperfect intermediate image of the scene, where the intermediate image includes localized aberrations. The microcameras relay portions of the intermediate image onto their respective focal-plane arrays, while also reducing the localized aberrations, to yield a plurality of highly resolved optical sub-images. The focal-plane arrays convert the plurality of optical sub-images into digital sub-images of the relayed portions of the scene, which are then processed to form a composite digital image of the entire scene.

The multiscale imaging approach affords advantages over other imaging approaches. First, the collecting and processing functions afforded by the objective lens and microcameras, respectively, can be individually improved without significantly compromising the design of the other. It also enables a large-scale objective lens to be used with a large-count multi-aperture array, thereby reducing the trade-off between geometric aberration and instantaneous field of view.

The multiscale imaging approach also enables adjacent microcameras to generate sub-images of overlapping portions of the scene. This can be used to ensure that light from a given point is always captured by at least one microcamera. As a result, a multiscale imaging system can eliminate blind spots due to obscuration, such as those typically found in reflective imaging systems.

Second, by providing wavefront correction at the optics of the microcameras to correct aberrations introduced by atmospheric perturbation and/or the large-scale objective lens, the design complexity of the objective lens can be significantly reduced. This also enables faster collection optics, which reduces overall system volume.

Third, multiscale imaging is capable of improved image resolution.

Fourth, manufacturing cost and complexity can be significantly lower for a multiscale imaging system. Smaller lenses are better at providing wavefront correction because: 1) wavefront correction and image formation both yield geometric solutions with less wavelength-scale error over smaller apertures; and 2) manufacturing of complex lens surfaces is much easier in smaller scale systems.

Fifth, as described in U.S. patent application Ser. No. 13/889,007, filed May 7, 2013 and which is incorporated herein by reference, a multiscale imaging system with microcameras having one or more controllable camera settings (e.g., focus, exposure, gain, magnification, dynamic range, etc.) enables the microcameras to focus at diverse ranges with overlapping image regions. In other words, different microcameras can image different depths within the three-dimensional image field provided by the objective lens. Controllable magnification enables control over the amount of overlap between the images formed by different cameras. As a result, portions of the scene can be imaged by multiple cameras having different illumination level, dynamic range, color filtering, etc. By employing various configurations of focus, exposure, gain, and dynamic range among the microcameras, a composite image can be reconstructed such that it has enhanced depth-of-field, enhanced dynamic range, includes tomographic object reconstruction, is substantially three-dimensional, and/or includes parallax views of the scene.

In addition, including dynamic camera settings in the microcameras enables imaging systems in accordance with the present invention to compensate for misalignment during assembly or environmental perturbations, such as dynamic effects caused by wind, temperature changes, vibration, shock, and the like.

Figure 2:
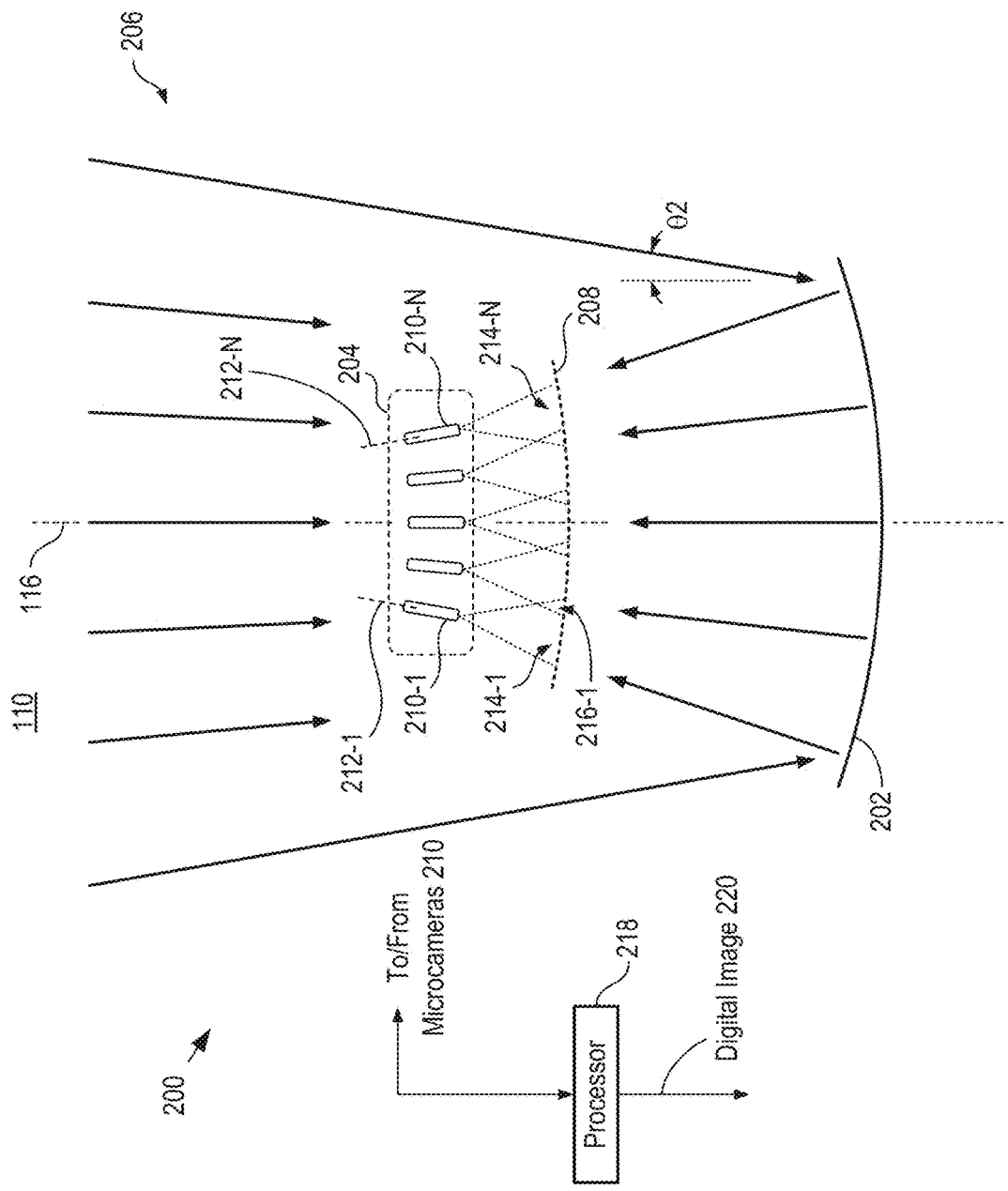
FIG. 2 depicts a schematic drawing of a cross-sectional view of a multiscale telescopic imaging system in accordance with an illustrative embodiment of the present invention.

FIG. 2 depicts a schematic drawing of a cross-sectional view of a multiscale telescopic imaging system in accordance with an illustrative embodiment of the present invention. System 200 includes objective lens 202 and microcamera array 204. System 200 is a multiscale imaging system designed to operate at wavelengths within the range from approximately 486 nm to approximately 656 nm. System 200 provides high-resolution imaging capability over a large instantaneous field of view—as large as 60°—and has an aperture of 0.0079 $m^2$ for an etendue of 0.0067 Sr·$m^2$. System 200 includes 4272 microcameras, which operate in a manner equivalent to 4272 telescopes, each having a 1.15° field of view. While there are challenges utilizing the relatively small aperture of system 200, the large instantaneous field of view enables observation of many astronomical phenomena that might otherwise go unrecorded because system 200 enables large swaths of the sky to be continuously monitored. In addition, system 200 is small enough that equatorial mounting is possible. As a result, long exposures that compensate for sidereal motions could be more readily achieved for a wide field.

Figure 3:
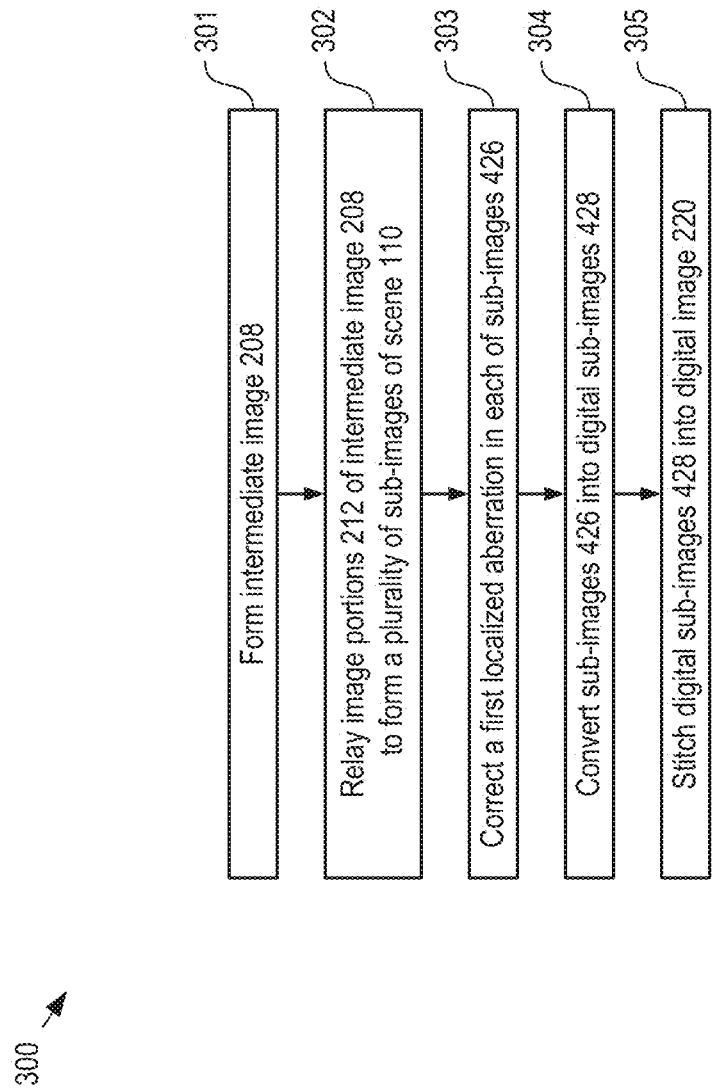
FIG. 3 depicts operations of a method for imaging a scene in accordance with the illustrative embodiment of the present invention.

FIG. 3 depicts operations of a method for imaging a scene in accordance with the illustrative embodiment of the present invention. Method 300 begins with operation 301, wherein objective lens 202 forms intermediate image 208.

Objective lens 202 is a monocentric reflective lens having a substantially spherical shape. Objective lens 202 has an aperture of approximately 150 mm and a focal length of approximately 600 mm. Objective lens 202 forms intermediate image 208 such that the intermediate image has a substantially spherical shape having a radius of approximately 600 mm. One skilled in the art will recognize that intermediate image 208 is typically characterized by significant spherical aberrations but little or no chromatic aberrations. Objective lens 202 is designed to image light rays received from scene 110 over an instantaneous field of view equal to 2*θ2, where θ2 is as large as 30°. It should be noted that, in some embodiments, objective lens 202 enables instantaneous fields of view larger than 60°; however, in the illustrative embodiment, θ2 is limited to 7° to mitigate the deleterious effects of atmospheric aberrations, which increase as a function of angle from zenith.

At operation 302, microcamera array 204 relays image portions 214 to form a plurality of sub-images of scene 110. Microcamera array 204 comprises microcameras 210-1 through 210-N (referred to, collectively, as microcameras 210).

Microcamera array 204 is a two-dimensional array of N microcameras, which are arranged in an arrangement that substantially matches the shape of intermediate image 208. In the illustrative embodiment, N=4272; however, the value of N is design dependent. It is an aspect of the microcamera array 204 that its arrangement includes gaps between the microcameras that allow light from scene 110 to reach objective 202 so as to mitigate obscuration. Details of the arrangement of microcamera array 204 is described below and with respect to FIGS. 7A-C.

It should be noted that, since objective lens 202 is monocentric, all of its surfaces have the same center of curvature. As a result, the aberrations in intermediate image 208 are invariant with field angle and intermediate image 208 is formed on a spherical surface that is also concentric with objective lens 202. The aberration invariance with field angle enables the use of the same optical design for each of microcameras 210, which affords embodiments of the present invention the potential for significantly lower cost.

It is an aspect of the present invention that microcameras 210 are designed and arranged such that light rays relayed to their respective focal plane arrays are incident on the focal plane array at near normal incidence to minimize magnification change when refocusing and to mitigate lateral chromatic aberration. As a result, each microcamera 210 is aligned along a unique secondary optical axis 212 that is substantially normal to its corresponding portion of intermediate image 208.

Figure 4:
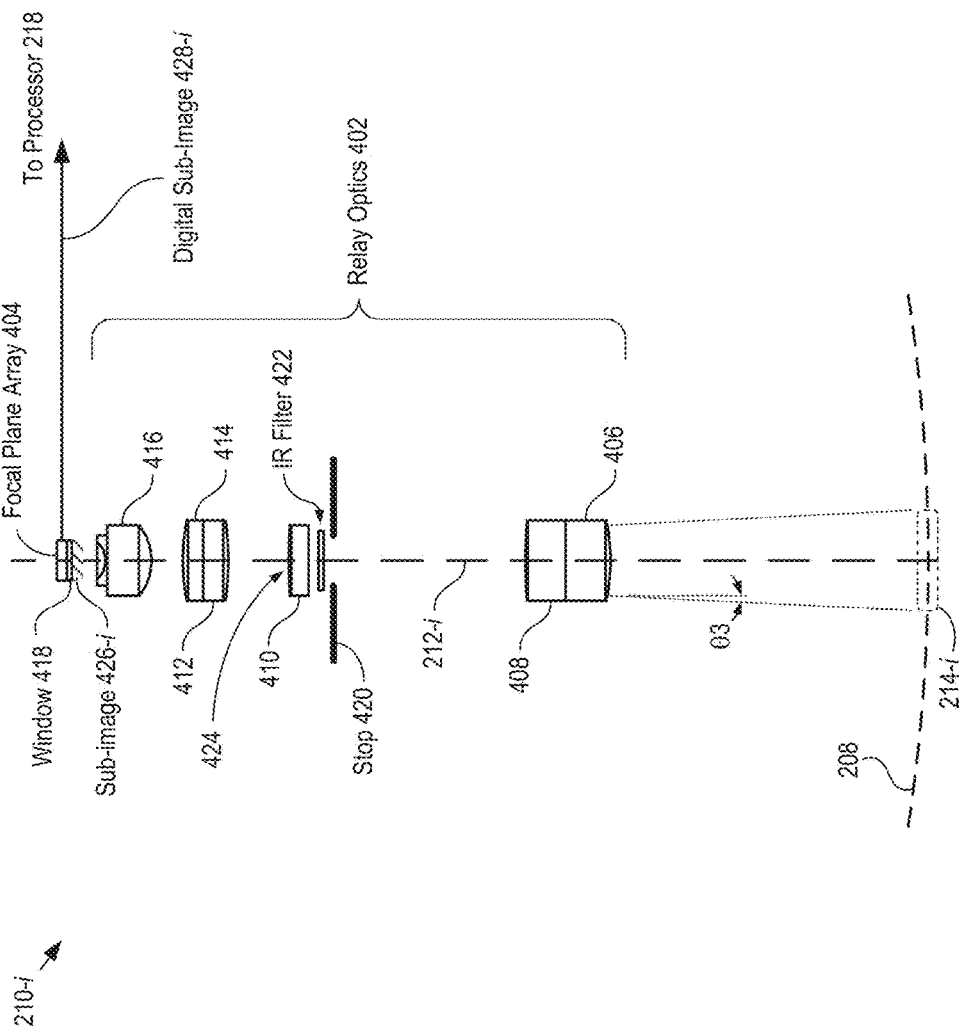
FIG. 4 depicts a schematic drawing of a cross-sectional view of a microcamera in accordance with the illustrative embodiment of the present invention.

FIG. 4 depicts a schematic drawing of a cross-sectional view of a microcamera in accordance with the illustrative embodiment of the present invention. Microcamera 210-i is representative of each of microcameras 210 and comprises relay optics 402 and focal plane array 404. Microcamera 210-i relays image portion 214-i of intermediate image 202 to form sub-image 426-i on focal plane array 404.

Relay optics 402 comprises lenses 406, 408, 410, 412, 414, and 416, which are arranged in four groups along secondary optical axis 212-i, as well as stop 420 and conventional IR filter 422. Each of lenses 406, 408, 410, 412, 414, and 416 is a molded plastic aspheric lens. One skilled in the art will recognize that the use of plastic lenses facilitates mass production of microcameras 210. The materials used in relay optics 402 include: N-BK7, having a refractive index of 1.515800 and an Abbe Number of 64.167336; LF5, having a refractive index of 1.581440 and an Abbe Number of 40.851305; E48R, having a refractive index of 1.531160 and an Abbe Number of 56.043828; and OKP4, having a refractive index of 1.607327 and an Abbe Number of 26.992638.

Table 1 in Appendix A provides a prescription for the design of microcamera 210 in accordance with the illustrative embodiment. These design parameters realize a microcamera that, in concert with objective lens 202, is designed to image at f/2.5, with the corresponding effective f/# in the objective image space f/4 for diffraction limited performance with a 2.3 mm radius image at focal plane arrays 404 that corresponding to 1.15° in the sky (i.e., θ3=0.575). In some embodiments, at least one of lenses 406, 408, 410, 412, 414, and 416 comprises a glass (with suitable modification to the camera prescription), such as Schott N-BK7 crown glass or OHARA L-TIM28 flint glass, which would provide improved homogeneity and decreased thermal variation as compared to plastic lenses. In some applications, system 200 is operated in a different temperature range (e.g. a mountaintop) where temperature control is not possible. In such applications, optimization of the lens surfaces for performance at a lower temperature is preferable. Further, the use of glass elements in such applications is also preferable, since glass typically has smaller thermal variation.

It should be noted that the design parameters for, and materials used in, microcameras 210 provided are merely exemplary and it will be clear to one skilled in the art, after reading this Specification, how to specify, make, and use alternative embodiments of the present invention wherein objective lens 202 and microcameras 210 have any suitable design. It will be clear to one skilled in the art, after reading this Specification, how to specify, make, and use alternative embodiments without departing from the scope of the present invention.

Table 2 in Appendix A provides aspheric coefficients for the prescription provided in Table 1. Aspheric coefficients are based on a spherical reflective objective lens. The aspheric surfaces are designed to image at f/2.5 with diffraction limited performance with a 2.3-mm radius image at the focal plane array 404 (corresponding to 1.15° in the sky). The surface sag of an asphere is given by the formula:

$$z(r) = \frac{r^2}{R(1+\sqrt{1-\left(\frac{r}{R}\right)^2})} + a_2 r^4 + a_3 r^6 + a_4 r^8 + a_5 r^{10}$$

Lenses 406 and 408 collectively define a first doublet that forms an approximately collimated space into which the pupil is placed.

Lens 410 is a slightly converging element located near the pupil. Lens 410 includes diffractive surface 424.

Lenses 412 and 414 collectively define a second doublet. Due to thermal variations in the atmosphere, objective 202, and/or microcameras 210 themselves, it is desirable that the microcameras be capable of moderate refocusing. As a result, lenses 412 and 414 are arranged to be movable along secondary optical axis 212-i. Mechanisms for enabling motion of lenses 412 and 414 are described in detail in U.S. patent application Ser. No. 13/889,007.

Lens 416 is a meniscus lens that serves to form a flat field on the sensor.

Stop 420 is a paraxial stop located within microcamera 210 so that the stop effectively rotates with field angle. It is an aspect of the present invention that the inclusion of stop 420 mitigates off-axis vignetting in microcamera 210 at the periphery of the objective field.

It should be noted that diffractive surface 424 of lens 410 is located near stop 420 to enable color correction that is approximately the same at both on- and off-axis field points. As a result, diffractive surface 424 corrects chromatic aberration of the objective. Further, lens 410 is designed to be slightly converging to prevent vignetting of the rays on the walls of the optical barrel (not shown for clarity) that contains relay optics 402 and focal plane array 404.

One skilled in the art will recognize that atmospheric perturbations, as well as the characteristics of objective lens 202, give rise to intermediate image 208 being characterized by localized aberrations. It should be noted that the arrangement of objective lens 202 and microcamera array 204 in system 200 provides a degree of compensation for field curvature, which is a global aberration. For the purpose of this Specification, including the appended claims, a "global aberration" is defined as an aberration that extends, in slowly varying fashion, across multiple optical fields, such as field curvature. A "localized aberration" is defined as an aberration, or a portion of a global aberration, that is substantially unique to an individual optical field. For example, a plurality of localized aberrations might collectively define a global aberration; however, the magnitude of wavefront distortion associated with each localized aberration is substantially unique to its associated individual optical field. Examples of localized aberrations include spherical aberration, axial chromatic aberration, and spherochromatism.

At operation 303, each of microcameras 210 reduces a first localized aberration in each of image portions 214.

For each microcamera 210, relay optics 402 is designed to correct at least one localized aberration, such as spherical aberration, axial chromatic aberration, and/or spherochromatism, in the image portion it relays to its respective focal-plane array 404. For the purposes of this Specification, including the appended claims, correcting an aberration is defined as reducing its magnitude.

Chromatic aberration of objective lens 202 is corrected by diffractive surface 424, which is included in lens 410. By placing diffractive surface 424 near the paraxial stop (i.e., stop 420), color correction is approximately the same at both on- and off-axis field points.

The phase of this diffractive surface (in radians) are given by the equation $\phi(r)=a_1 r^2+a_2 r^4+a_3 r^6$, where the diffractive phase profile coefficients are provided in Table 3 in Appendix A.

Figure 5:
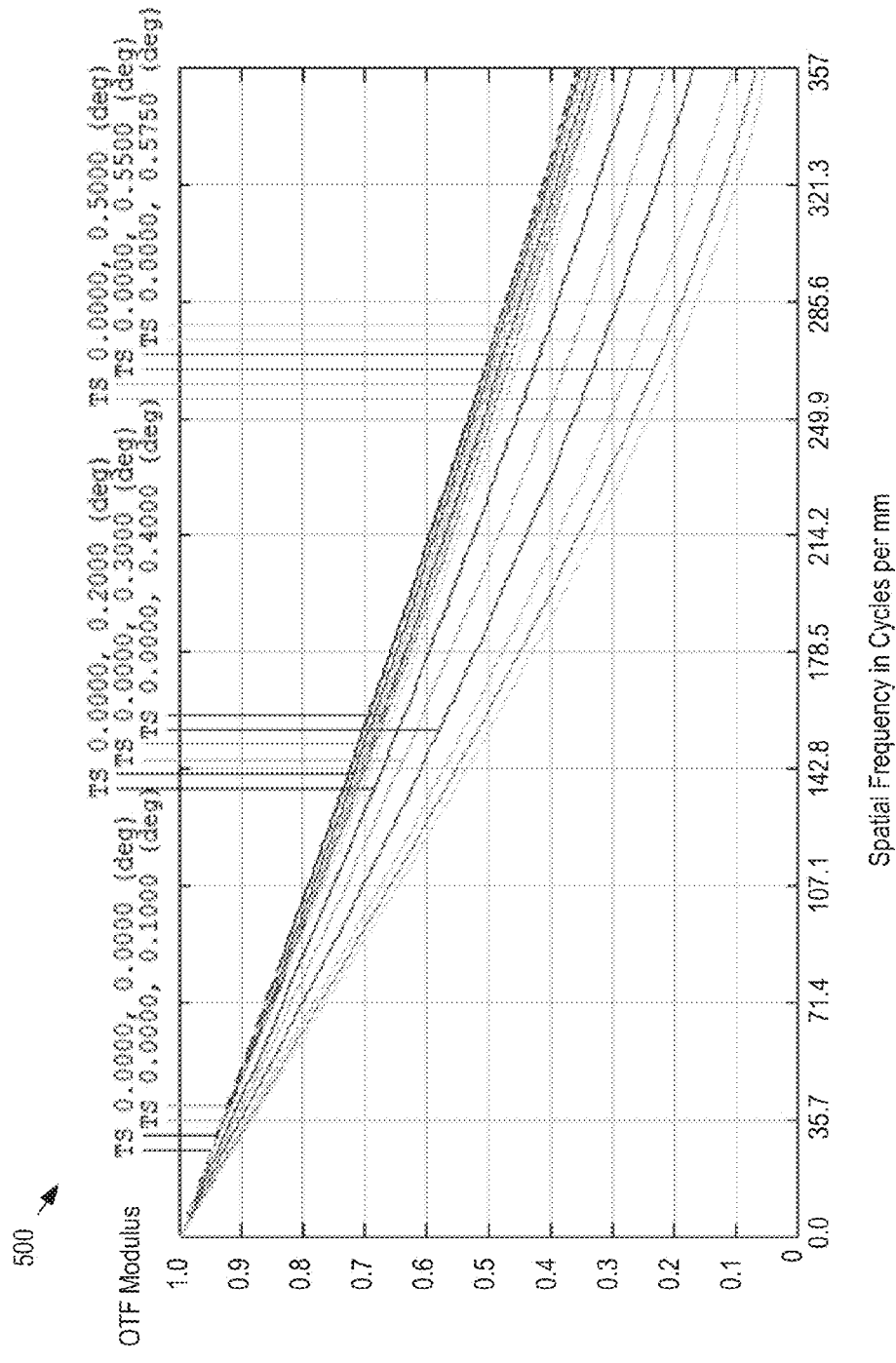
FIG. 5 depicts a modulation transfer function of an individual microcamera within system 200.

FIG. 5 depicts a modulation transfer function of an individual microcamera within system 200. It can be seen from plot 500 that the imaging performance of system 200 is largely diffraction limited throughout the field of view of a microcamera 210-i. The highest spatial frequency corresponds to approximately 1.1 arcsec resolution.

One skilled in the art will recognize that manufacturing and assembly tolerances can make it challenging to maintain diffraction-limited performance at f/2.5. Typical microcamera assembly tolerances are ±25 micron decenter, ±0.1° tilt placement, ±50 micron element thickness and longitudinal displacement, 3 waves of power and 1 wave of irregularity. The RMS wavefront error, before and after these tolerances are applied, is 0.025 and 0.115 waves of error respectively.

FIGS. 6A-D depict results of a Monte Carlo simulation of assembly tolerances for system 200. Plots 600, 602, 604, and 606 show the modulation transfer function at field angles of 0, 0.3, 0.5, and 0.575 degrees, respectively, with an average 0.085 waves of error over 50 simulations which was consistent over many subsequent Monte Carlo trials.

At operation 304, sub-images 426 are converted into digital sub-images 428 at focal plane arrays 404.

Focal plane array 404 is a two-dimensional array of CMOS sensors having a pixel size of approximately 1.33 microns. The pixel size is small to enable many gigapixels in system 200. An example of a focal plane array suitable for use in microcamera 210 is the 1.4 µm pixel-pitch Aptina MT9F002 CMOS sensor, although other focal plane arrays, such as CCD arrays, can be used without departing from the scope of the present invention.

The radius of the sub-image formed on the focal plane array is 2.35 mm, which is constrained by the short dimension of the focal plane array. Because most commercial focal plane arrays have a rectangular rather than a square aspect ratio, the periphery of the focal plane array is not illuminated and therefore is typically not sampled.

As discussed above, a challenge for using reflective optics in telescopic imaging systems is obscuration caused by the imaging surface itself. The wider the image field used, the more of the primary mirror aperture is blocked. For a sufficiently wide angle, this can result in the center of the image being completely vignetted.

It is an aspect of some of embodiments of the present invention that high resolution and contrast of an image can be retained by placing microcameras 210 sparsely in the image plane with gaps between them to allow light from scene 110 to reach objective 202. In the illustrative embodiment, therefore, microcamera array 204 is arranged in a hexagonal uniformly redundant array (HURA) having array parameters v and r are equal to 31 and 6, respectively. Such an arrangement of microcameras minimizes the introduced nonuniformity in the modulation transfer function due to the obscuration because such configurations produce autocorrelations, and therefore transfer functions, with minimal variations in spatial frequency. In some embodiments, microcamera array 204 is arranged in another arrangement comprising gaps between microcameras, such as a Golay non-redundant aperture.

FIGS. 7A-C depict a model of a multiscale telescopic imaging system having a sparse arrangement of microcameras. The model is based on a pattern of microcameras arranged in a hexagonal uniformly redundant array with parameters v=31 and r=6. To model the vignetting of the microcamera array, this pattern is transformed into an HURA aperture, located at the image plane, with circular holes in the aperture corresponding to gaps between microcameras.

FIG. 7A depicts a cross-sectional view of the modeled system. System 700 comprises reflective objective 702 and HURA aperture 704, which is located at the image plane of objective 702. System 700 is analogous to system 200.

HURA aperture 704 includes circular holes 706, which correspond to gaps between microcameras 210 in microcamera array 204.

FIG. 7B shows light rays for on-axis field 708. These light rays pass through HURA aperture 704 whereas, without holes 706, the light rays of on-axis field 708 would be completely vignetted.

FIG. 7C shows light rays of edge field 710. Edge field 710 is only partially blocked by the HURA aperture and, therefore, is only partially vignetted by microcamera array 204.

Figure 8:
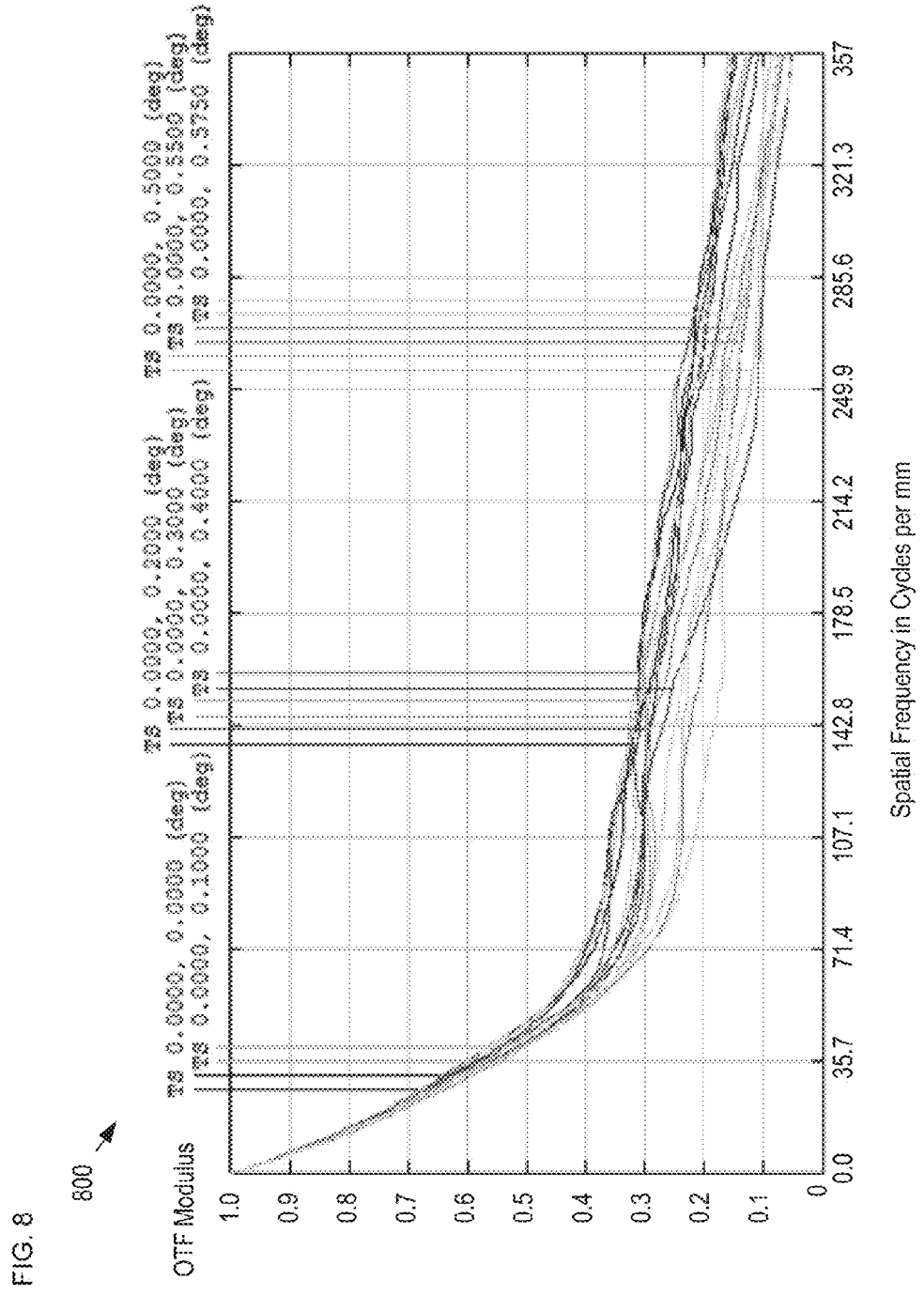
FIG. 8 depicts a modulation transfer function for a reflective multiscale telescopic imaging system having a microcamera array arranged in a HURA arrangement at the image plane.

FIG. 8 depicts a modulation transfer function for a reflective multiscale telescopic imaging system having a microcamera array arranged in a HURA arrangement at the image plane.

Plot 800 includes the effects of obscurations caused by microcamera array 204. Plot 800 can be compared to plot 500, described above and with respect to FIG. 5, which does not account for image plane vignetting due to obscurations by microcamera array 204. Plot 800 evinces that the vignetting of HURA aperture 704 causes a reduction in higher spatial frequencies, however, a fairly uniform modulation transfer function is still achieved. It should be noted that the flat modulation transfer function is due to autocorrelation properties of the HURA arrangement. The highest spatial frequency corresponds to the Nyquist sampling rate (i.e., 1.1 arcsec resolution).

As depicted in FIG. 2, microcameras 210 are designed and positioned in microcamera array 204 such that the image portions 214 of adjacent microcameras overlap in overlap regions 216. It is an aspect of the present invention that image portions of several microcamera-telescopes can be used to complement each other to compensate for obscuration and/or vignetting that can occur due to light blockage by the microcameras themselves. In addition, overlap regions 216 enable points in these overlap regions to be relayed by more than one microcamera, which facilitates stitching digital sub-images 428 into composite digital image 220.

It should be noted that splitting rays at the edge of the fields of view of adjacent microcameras can cause tangential vignetting and a corresponding decrease in tangential resolution.

At operation 305, processor 218 receives digital sub-images 428-1 through 428-N and stitches them together to form digital image 220.

Figure 9:
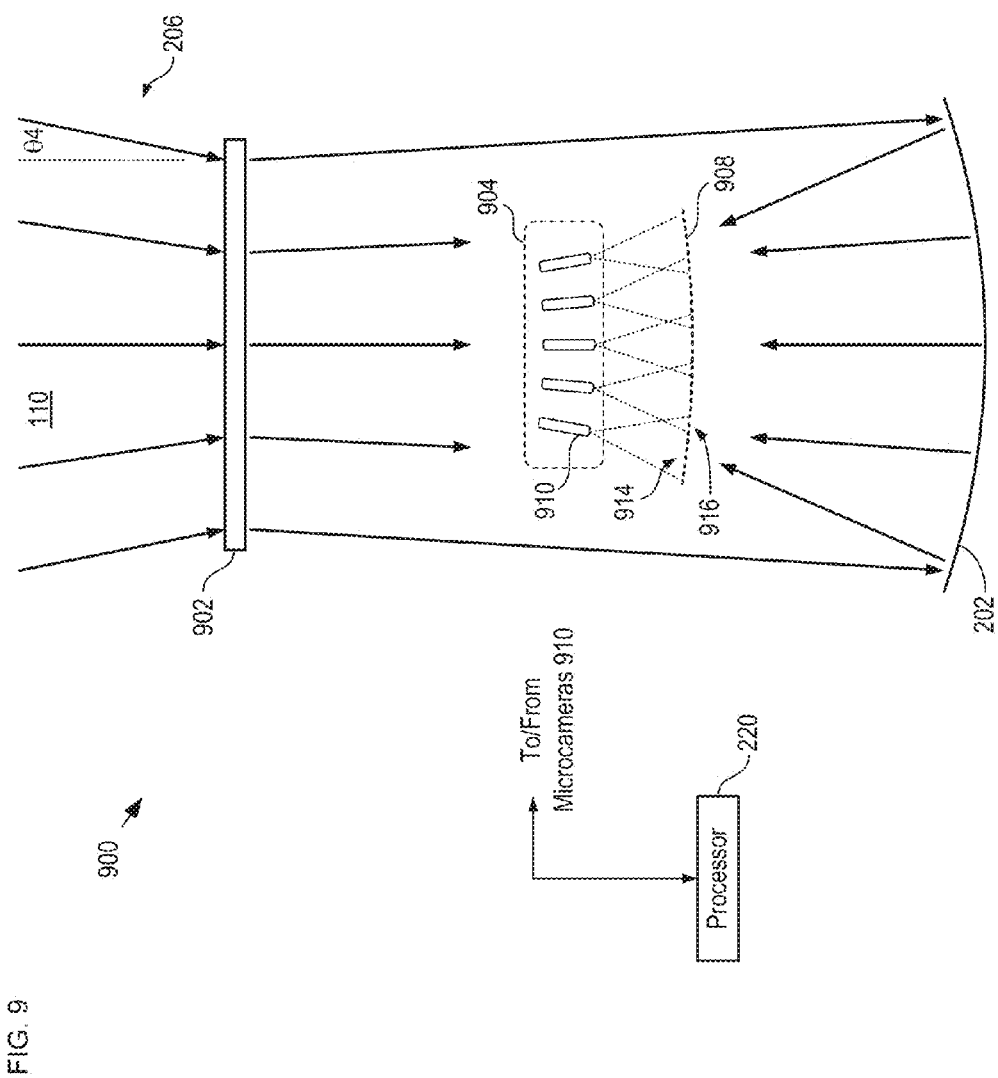
FIG. 9 depicts a multiscale telescopic imaging system in accordance with a first alternative embodiment of the present invention.

FIG. 9 depicts a multiscale telescopic imaging system in accordance with a first alternative embodiment of the present invention. System 900 comprises objective lens 202, microcamera array 904, and Schmidt corrector plate 902. System 900 is analogous to system 200, but also includes Schmidt corrector plate 902 to reduce spherical aberrations in intermediate image 908. The addition of Schmidt corrector plate 902 requires alteration of the prescription for microcameras 910; however, the basic microcamera layout remains the same as that of microcamera 210.

FIGS. 10A-B depict spot diagrams and ray fans for system 200.

FIGS. 10C-D depict spot diagrams and ray fans for system 900.

A comparison of plots 1000 and 1002 versus plots 1004 and 1006 shows that the system 200 (i.e., a telescopic imaging system having a spherical mirror but no Schmidt corrector plate) exhibits significant spherical aberrations but no chromatic aberrations. System 900 (i.e., system 200 including Schmidt corrector plate 902), on the other hand, exhibits a slight amount of spherochromatism. The Schmidt corrector introduces off-axis aberrations and therefore is not truly monocentric, however, an instantaneous field of view of 10° is still readily achievable.

Schmidt corrector plate 902 is an aspheric lens having spherical aberration that is the complement (i.e., equal to, but opposite of, the spherical aberration of objective lens 202. Schmidt corrector plate 902 corrects the paths of light rays 206 such that the light reflected from the outer part of the objective lens and light reflected from the inner portion of the objective lens is brought to the same focus.

Tables 4, 5, and 6 in Appendix A provide the prescription, aspheric surface coefficients, and diffractive phase polynomial, respectively, for system 900.

Figure 11:
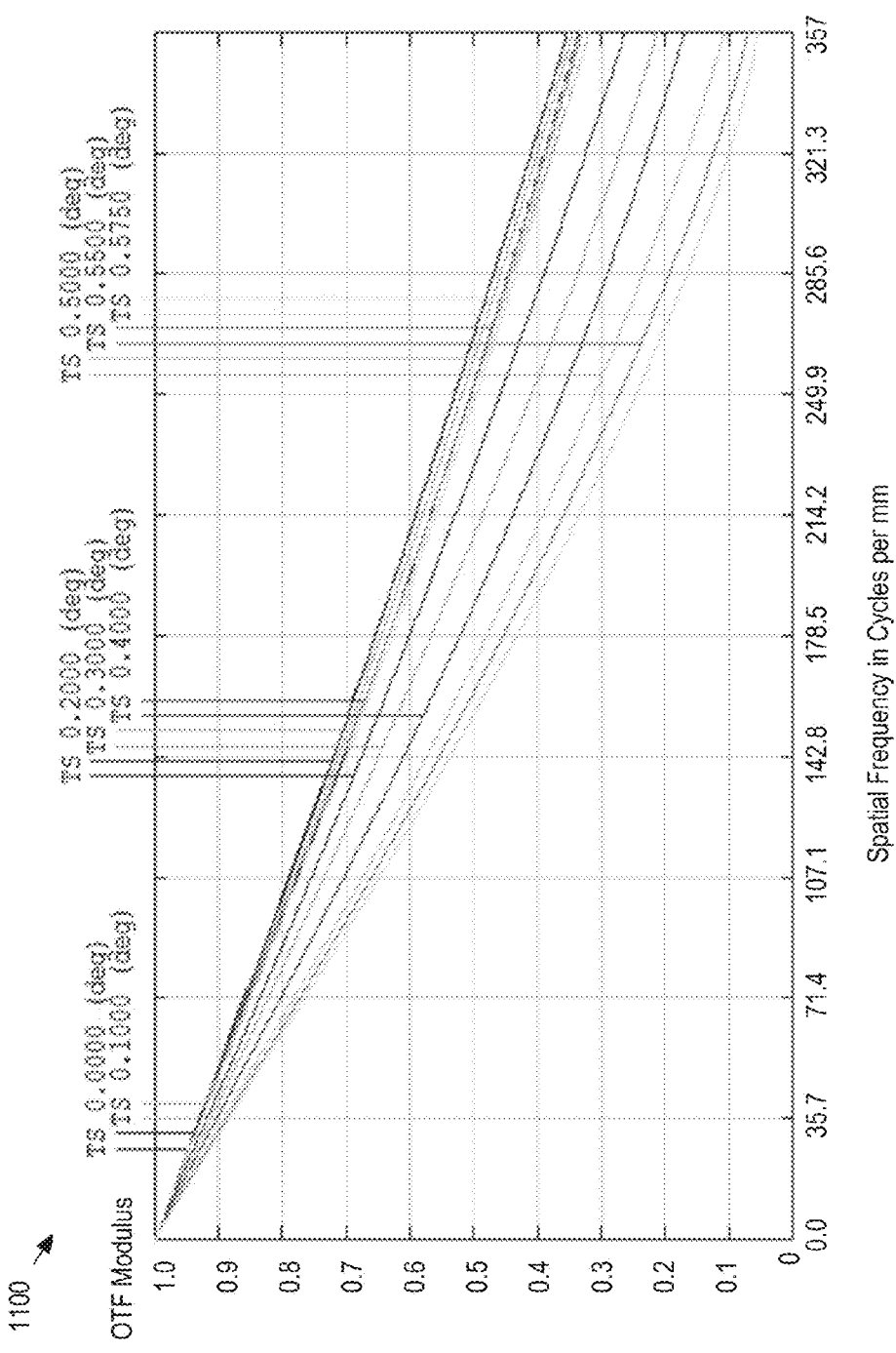
FIG. 11 depicts the modulation transfer function of system 900.
Figure 12:
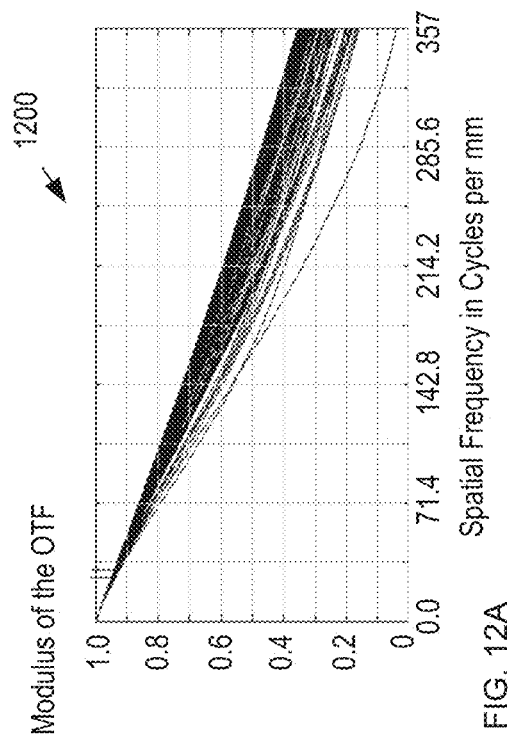
FIGS. 12A-D depict Monte Carlo simulations of the performance of system 900 under realistic manufacturing conditions.

FIG. 11 depicts the modulation transfer function of system 900. Plot 1100 shows the nominal modulation transfer function of a sub-image formed at a focal plane array of a microcamera 910. It should be noted that the highest spatial frequency corresponds to the Nyquist sampling rate or 1.1 arcsec resolution.

FIGS. 12A-D depict Monte Carlo simulations of the performance of system 900 under realistic manufacturing conditions. Plots 1200, 1202, 1204, and 1206 show Monte Carlo modulation transfer functions at four field points (i.e., field angles of 0, 0.3, 0.5, and 0.575 degrees, respectively) after accounting for manufacturing tolerances simulated for the Schmidt camera objective monocentric multiscale camera. The tolerances are ±25 micron surface and element decenter, 0.1° surface and element tilt, and ±50 micron element-thickness and axial-placement tolerances.

Multiscale Schmidt telescopes have the advantage of relaxing the demands on the microcameras to correct aberrations at the expense of requiring a large Schmidt corrector. It should be noted that these designs can be scaled to larger sizes, with a corresponding relaxation in the tolerances, and maintain 1.1 arcsec performance. Therefore microcameras that can be inexpensively mass produced can offset the additional cost of fabricating large, well-corrected optical elements.

Figure 13:
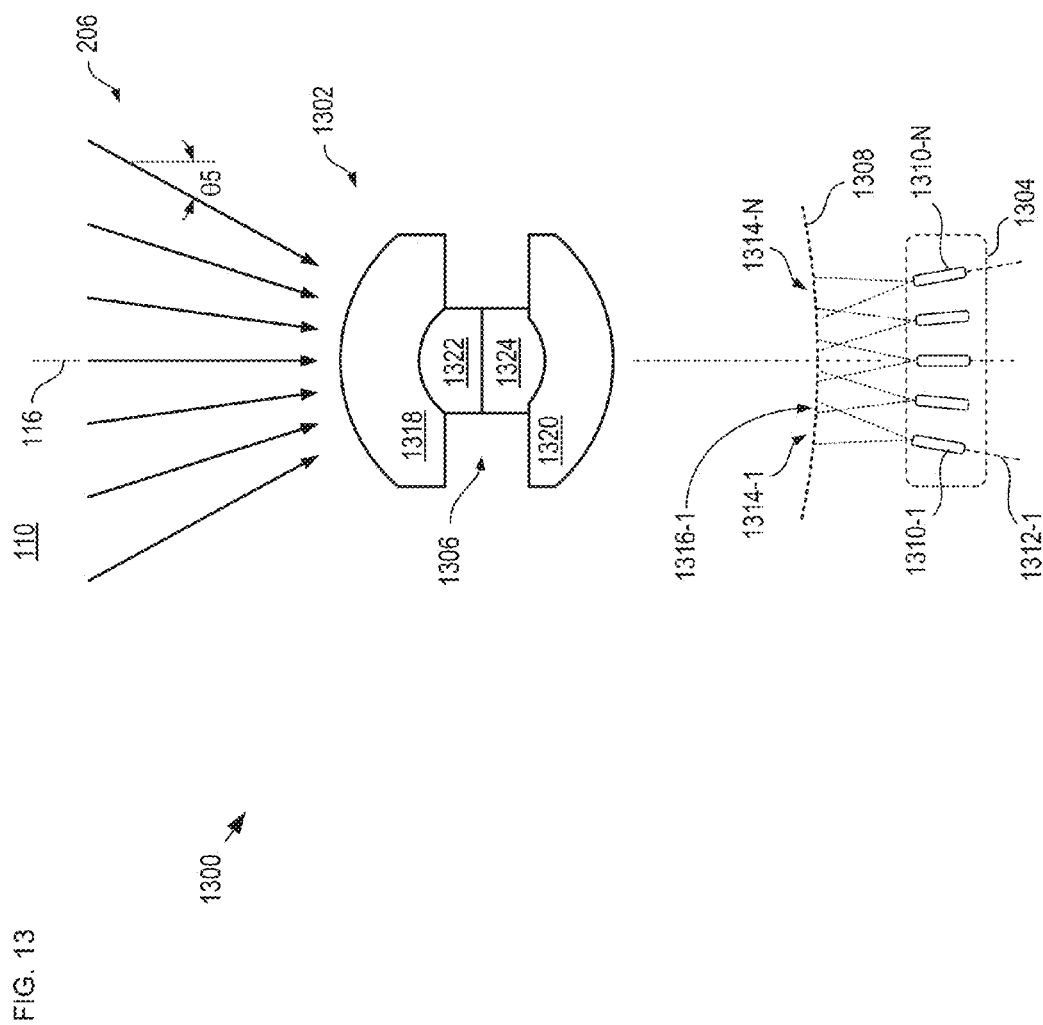
FIG. 13 depicts a schematic drawing of a multiscale telescopic imaging system in accordance with a second alternative embodiment of the present invention.

FIG. 13 depicts a schematic drawing of a multiscale telescopic imaging system in accordance with a second alternative embodiment of the present invention. System 1300 comprises objective lens 1302 and microcamera array 1304.

System 1300 is a multiscale imaging system designed to operate at wavelengths within the range from approximately 486 nm to approximately 656 nm. System 1300 provides high-resolution imaging capability (approximately 1.1 arcsec) over a 60° instantaneous field of view and has a focal length of 251.3 mm.—and has an aperture of 0.0079 m$^2$ for an etendue of 0.0067 Sr·m$^2$. System 1300 includes 4272 microcameras, which operate in a manner equivalent to 4272 telescopes, each having a 1.15° field of view. The f/# of the image formed on the microcamera sensor is f/2.5, with the corresponding effective f/# in the objective image space f/4. Operation of system 1300 is analogous to method 300 described above and with respect to system 200.

The prescription, aspheric coefficients, and the profile for diffractive surface for system 1300 is provided in Tables 7, 8, and 9 in Appendix A, respectively.

Objective lens 1302 is a multi-element monocentric lens comprising lens element 1306, entry lens shell 1318, and exit lens shell 1320.

Lens element 1306 is a partial sphere that includes hemispheres 1322 and 1324, each of which comprises Schott N-BK7 glass.

Each of entry lens shell 1318 and exit lens shell 1320 is a monocentric meniscus element that comprises Schott LF54 glass.

The glasses chosen for use in objective lens 1302 can be produced in large, homogeneous blanks with few striae and up to 300-mm thick using a continuous melting process. The coefficients of thermal expansion of the two materials are fairly compatible, with LF5 being 9.1×10$^{-6}$/° C. and N-BK7 7.1×10$^{-6}$/° C., which is important given the large sizes of the elements. The thicknesses of the required slabs of LF5 in this design are limited to 290 mm as it is assumed that 5 mm must be sacrificed for polishing on both faces of the slab.

The apertures of objective lens 1302 are oversized at 80° (rather than at the design objective of a 60° instantaneous field of view). This avoids vignetting of the field in microcameras 1310.

It should be noted that the combination of crown glass and flint glass in objective 1302 enables correction of chromatic aberrations, with the crown-glass lens element 1306 providing the positive power and the two flint-glass meniscus elements (i.e., entry lens shell 1318 and exit lens shell 1320) providing negative power. In addition, the radii minimize the spherical aberrations. The focal length of the f/4 objective lens is 616 mm.

Figure 14A:
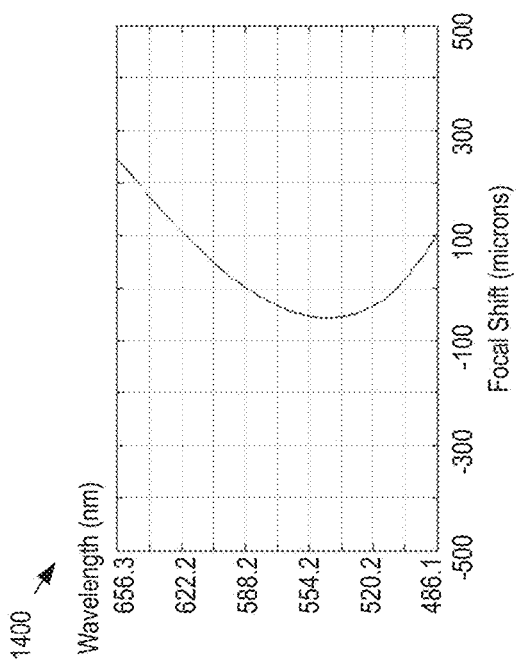
FIGS. 14A-C depict spot diagrams of various imaged field points, the on-axis ray fan, and the paraxial chromatic focal shift for intermediate image 1308.
Figure 14B:
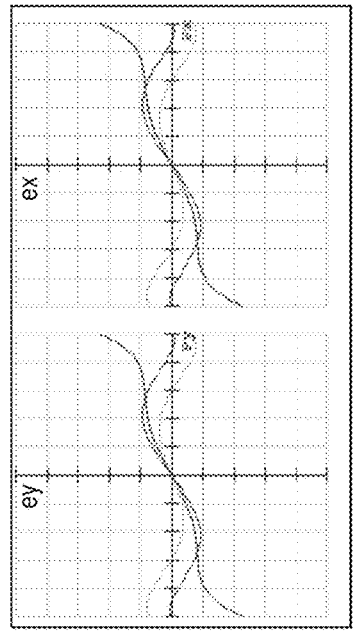
Figure 14C:
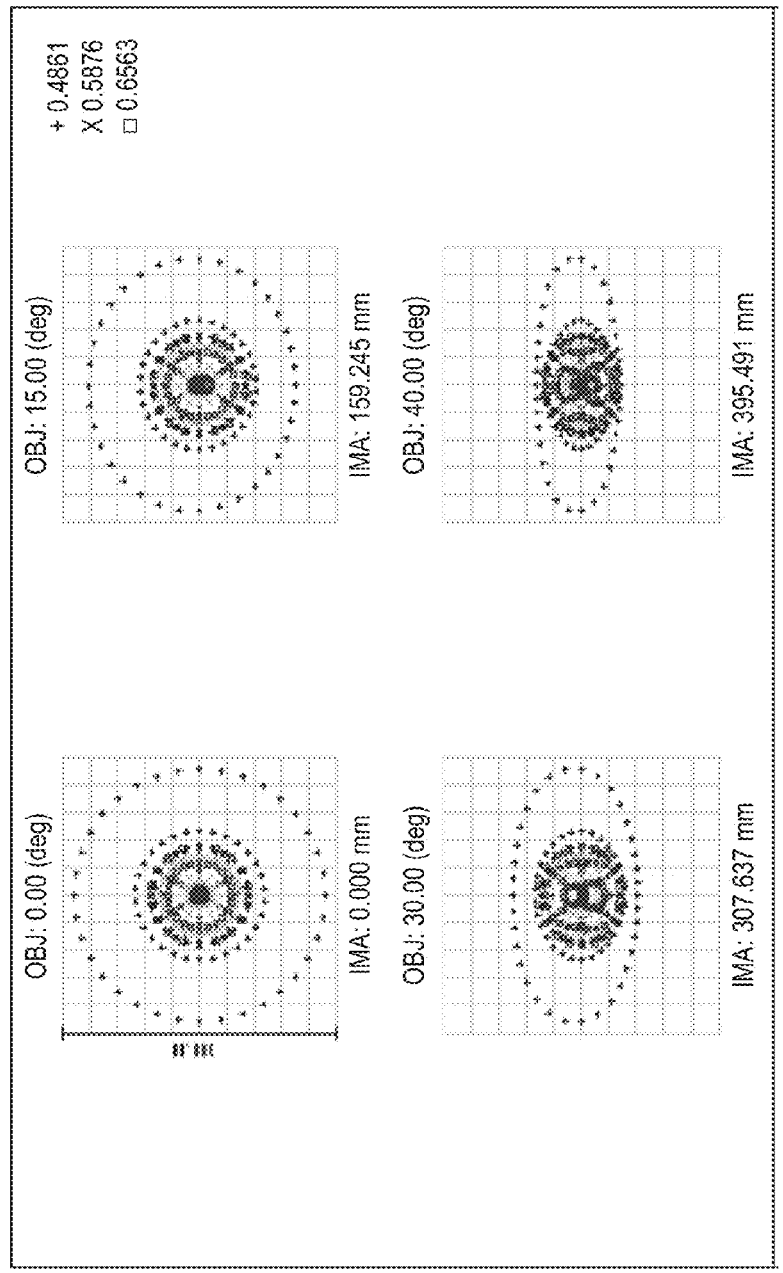

FIGS. 14A-C depict spot diagrams of various imaged field points, the on-axis ray fan, and the paraxial chromatic focal shift for intermediate image 1308.

Plot 1400 shows the chromatic focal shift of objective 1302.

Plot 1402 shows the ray fan of an on-axis ray in system 1300, which exhibits both spherical and chromatic aberrations.

Plot 1404 depicts spot diagrams formed by objective 1302 at off-axis angles of 0, 15, 30, and 40 degrees.

Plots 1400, 1402, and 1404 show that, over the wavelength range, there is up to 0.3 mm of focal shift throughout the band from 0.486 to 0.656 nm, which is much larger than the approximately 0.016 mm depth of field expected for an f/4 lens. In addition, the ray fan shows a spherical aberration of both 3rd and 5th order, with the rays deviating up to 0.015 mm from the focal spot, which should be about 0.002 mm when diffraction-limited. It is clear, therefore, that substantial axial chromatic and spherical aberrations are present. It should be noted that the secondary spectrum focal shift is 0.3 mm, the correction of which requires that each of microcameras 1310 include a diffractive element.

Figure 15:
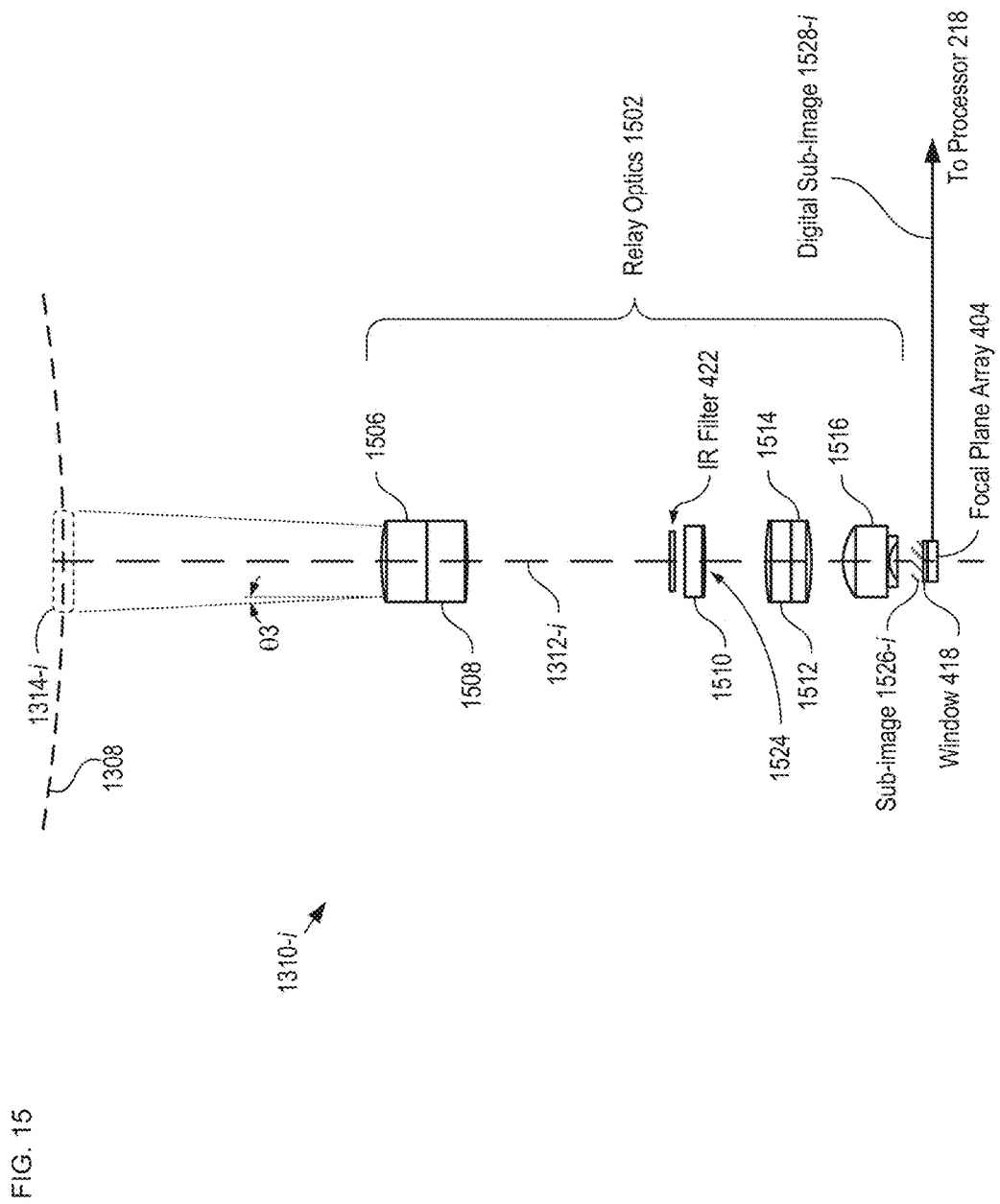
FIG. 15 depicts microcamera 1310-$i$ in accordance with the second alternative embodiment of the present invention.

FIG. 15 depicts microcamera 1310-$i$ in accordance with the second alternative embodiment of the present invention. Microcamera 1310-$i$ is analogous to microcamera 210-$i$, described above and with respect to FIG. 4; however, the elements of microcamera 1310-$i$ are designed for operation in a refractive telescopic imaging system comprising objective lens 1302. Microcamera 1310-$i$ is representative of each of microcameras 1310-1 through 1310-N.

Microcamera 1310-$i$ includes relay optics 1502 and focal plane array 404. Relay optics 1502 includes lens elements 1506, 1508, 1510, 1512, 1514, and 1516, as well as IR filter 422. Microcamera 1310-$i$ is designed to provide substantially the same instantaneous field of view as microcamera 210-$i$.

Each microcamera 1310-$i$ corrects aberrations of objective lens 1302 in its respective image portion 1314-$i$ and relays it to focal plane array 404 as sub-image 1526-$i$. These aberrations are of three types. First, intermediate image 1308 is curved, the curvature of field is corrected so that the image is formed on a flat sensor. As discussed above, field curvature is a global aberration.

Second, spherical aberrations in image portion 1314-$i$ are corrected. Spherical aberration is a localized aberration that is a geometric aberration. Spherical aberration is corrected by relay optics 1502 via the inclusion of aspheric surfaces.

Finally, intermediate image 1308 includes axial chromatic aberrations. These aberrations are also localized aberrations that are second-order and large in magnitude. System 1300 corrects these aberrations via diffractive surface 1524, which provides a large amount of chromatic dispersion with a partial dispersion very different than available optical materials.

While there are some diffraction efficiency losses, the large dispersion of diffractive surface 1524 can offset the large secondary chromatic aberration of objective 1302. This makes a diffractive an attractive choice for chromatic control despite its disadvantages. In some embodiments, correction of combinations of spherical and chromatic aberrations (e.g. spherochromatism) is included in microcamera 1310-*i*.

Like microcamera array 204, discussed above and with respect to FIG. 2, microcameras 1310 are designed and positioned in microcamera array 1304 such that adjacent microcameras can relay overlap regions 1316. Rays from field points in overlap regions 1316 are divided between adjacent microcameras so that an image may be formed in each microcamera. As a result, each of the multiple sub-images that are formed have only a fraction of the illumination of the original source point, and also has decreased resolution due to only partially filling the aperture of each camera.

Figure 16:
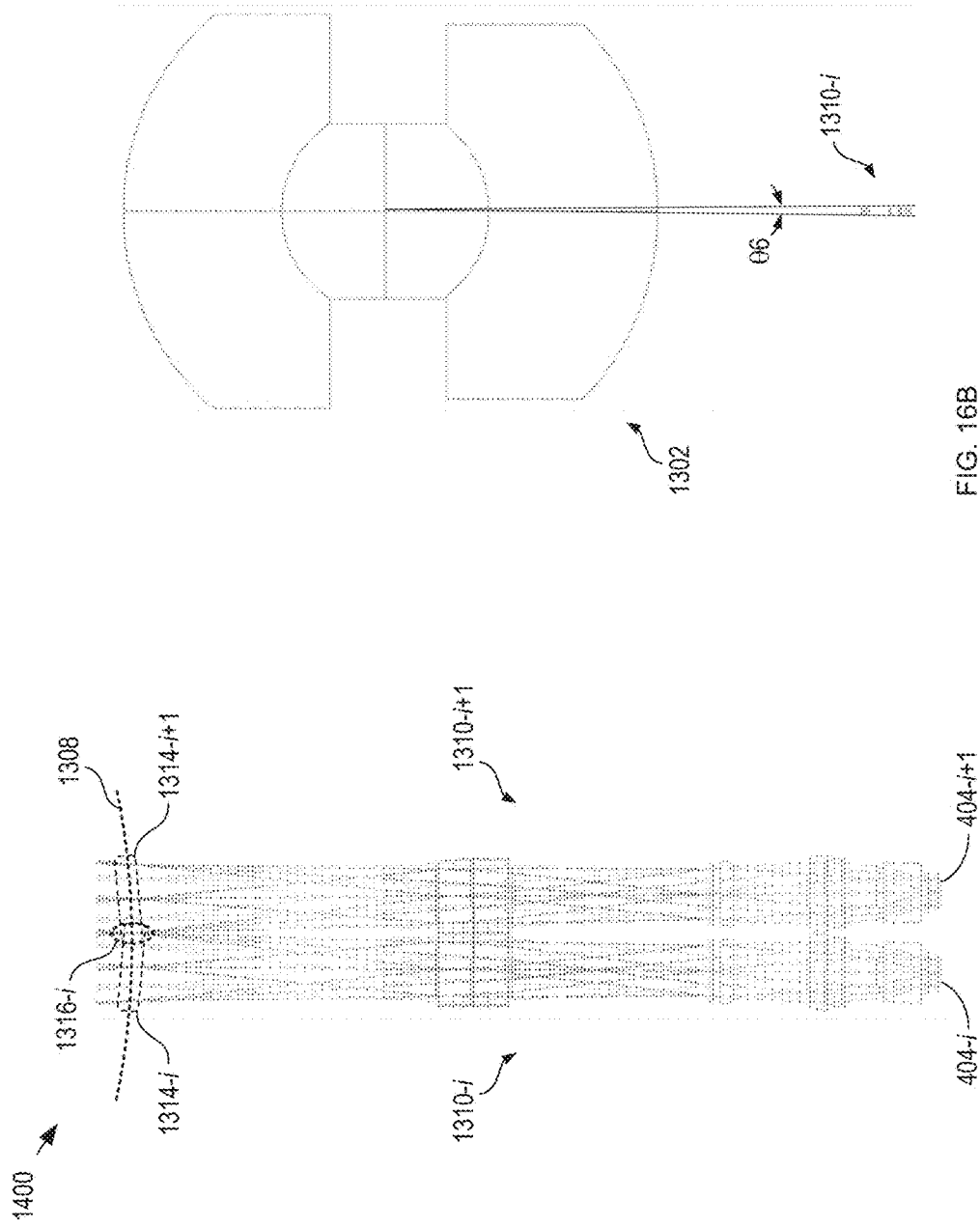
FIG. 16A shows an arrangement of two adjacent microcameras in accordance with the second alternative embodiment of the present invention.
FIG. 16B shows the maximum angle subtended by a microcamera optical assembly with respect to the center of objective lens 1302.

FIG. 16A shows an arrangement of two adjacent microcameras in accordance with the second alternative embodiment of the present invention. Microcameras 1310-*i* and 1310-*i*+1 are arranged side-by-side with focused field points of intermediate image 1308 being relayed to focal-plane arrays 404-*i* and 404-*i*+1. Overlap region 1316-*i* is split between microcameras 1310-*i* and 1310-*i*+1.

FIG. 16B shows the maximum angle subtended by a microcamera optical assembly with respect to the center of objective lens 1302. The cone angle, θ6, determines how closely microcameras 1310-*i* and 1310-*i*+1 can be located. If microcameras 1310-*i* and 1310-*i*+1 are placed so that the angle their optical axes 1312-*i* and 1312-*i*+1 subtend with respect to the center of objective lens 1302 is less than cone angle θ6, the two microcameras will mechanically interfere. As a result, it is desirable to design microcameras 1310 with the largest possible field size 1314 while maintaining the minimum cone angle to maximize the size of overlap regions 1316.

As discussed above, in some embodiments, overlap regions 1316 enable the use of microcamera-telescopes that complement each other to compensate for obscuration and/or vignetting that can occur due to light blockage by the microcameras themselves. In addition, overlap regions 1316 enable points in these overlap regions to be relayed by more than one microcamera, which facilitates stitching digital sub-images 1528 into composite digital image 220.

Figure 17:
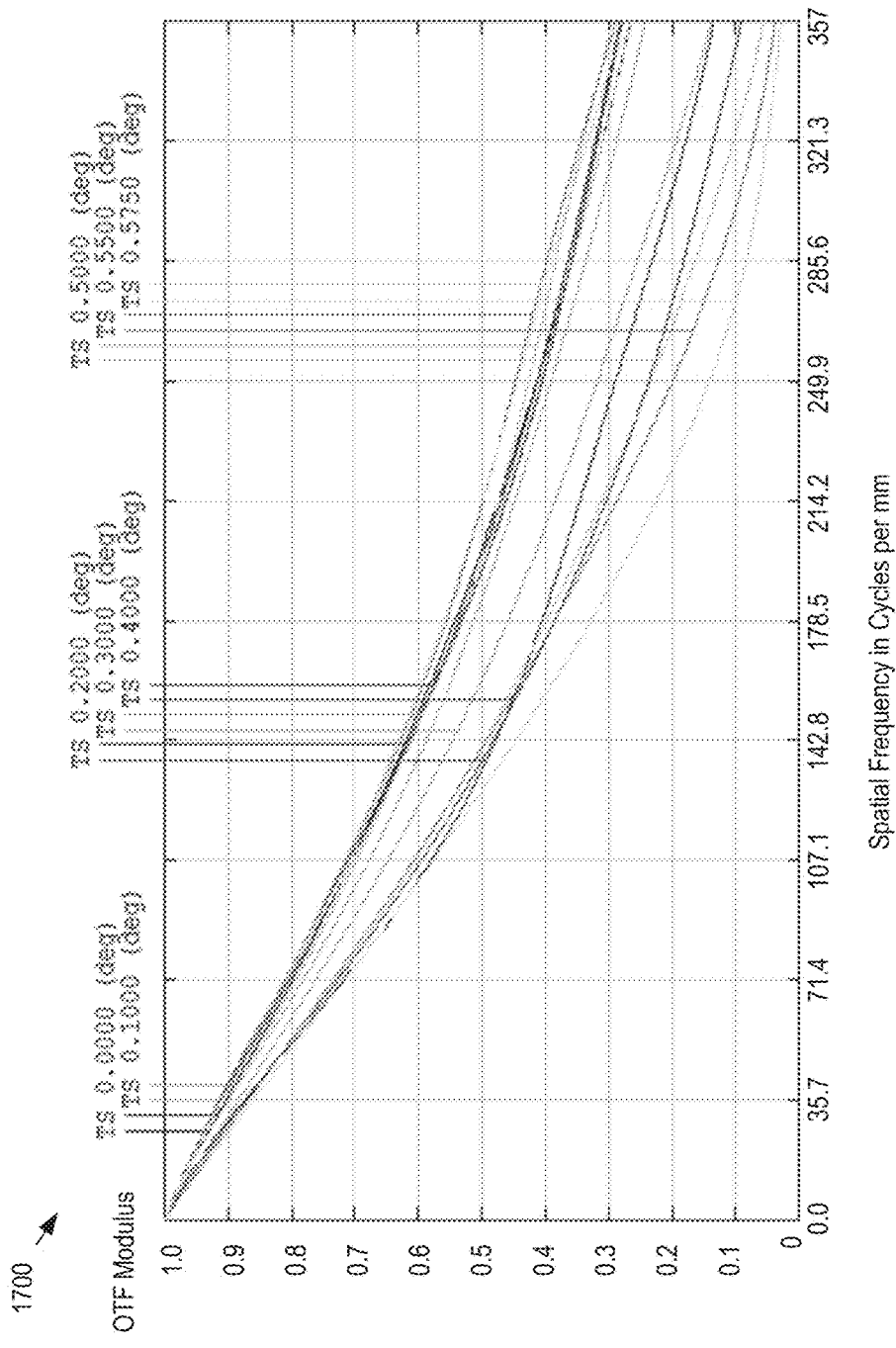
FIG. 17 depicts the modulation transfer function of sub-image 1526 at focal-plane array 404 in system 1300.

FIG. 17 depicts the modulation transfer function of sub-image 1526 at focal-plane array 404 in system 1300. Plot 1700 shows that the performance of objective lens 1302 is slightly decreased from that objective lens 202 (with or without Schmidt corrector plate 902). After accounting for the effects of obscuration in the reflective objective lens systems, however, the performance of objective lens 1302 is better in some cases. It should be noted that the highest spatial frequency corresponds to the Nyquist sampling rate (i.e., 1.1 arcsec resolution).

FIGS. 18A-D depict Monte Carlo simulations of the performance of system 1300 under realistic manufacturing conditions. Plots 1800, 1802, 1804, and 1806 depict Monte Carlo modulation transfer functions, accounting for assembly and fabrication tolerances, at angles of 0, 0.3, 0.5, and 0.575 degrees, respectively. The simulations are based on Monte Carlo modulation transfer functions from a simulation of 50 randomized assembly error instruments, while accounting for assembly tolerances of ±25 micron decenter, ±0.1° tilt placement, ±50 micron element thickness and longitudinal displacement, 3 waves of power and 1 wave of irregularity. Examination of plots 1800, 1802, 1804, and 1806 reveals that the RMS wavefront error, before and after these tolerances are applied, is 0.075 and 0.145 waves of error respectively. The average RMS wavefront error over the Monte Carlo trials is 0.115 waves and is consistent over the Monte Carlo runs.

Figure 19A:
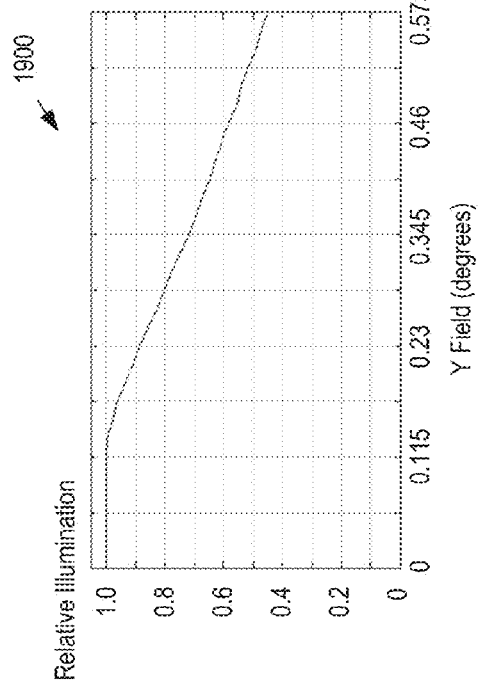
FIG. 19A depicts the relative illumination of microcamera 1310 by objective lens 1302 as a function of field position.

FIG. 19A depicts the relative illumination of microcamera 1310 by objective lens 1302 as a function of field position. Plot 1900 shows that the amount of light entering microcamera 1310 decreases as the field angle increases, because more of the illumination is captured by the neighboring cameras.

Figure 19B:
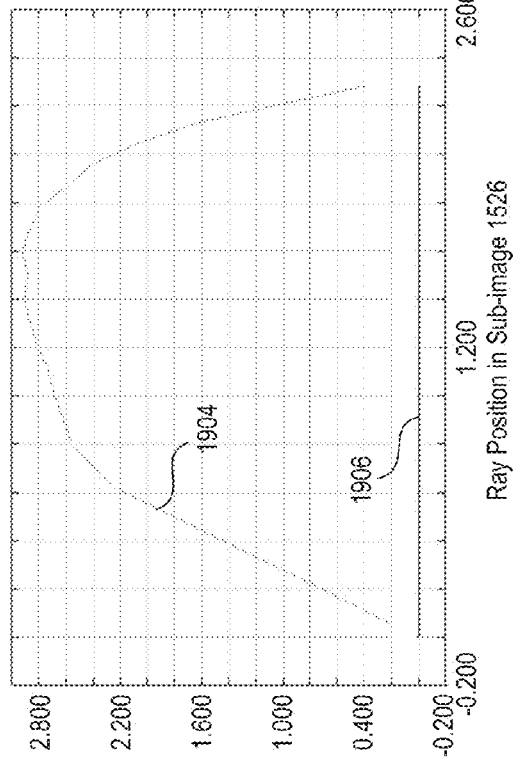
FIG. 19B shows the chief ray angle of system 1300 as a function of field position.

FIG. 19B shows the chief ray angle of system 1300 as a function of field position. Plot 1902 includes traces 1904 and 1906, which denote the sagittal and tangential rays, respectively. The chief ray angle is maintained within 3° of normal throughout the field. It should be noted that a chief ray angle near normal incidence minimizes variations in magnification caused by refocusing. As discussed above, some microcameras in accordance with the present invention include dynamic focus to enable compensation for effects such as thermal variations or chromatic aberrations.

FIG. 20A depicts a schematic drawing of a perspective view of an arrangement of a microcamera array in accordance with the second alternative embodiment of the present invention. Arrangement 2000 includes 4272 microcameras 1310, which are arranged on a hexagonal grid. Image portions 1314 are separated by an angle within the range of approximately 0.87° to approximately 0.94° on intermediate image 1308. Unequal spacing of image portions 1314 is required as there is no regular tiling of the sphere above 12 vertices. The maximum field angle is 0.575°, so that there is a 0.105° angle of overlap of microcamera 1310 with its neighbors (excluding positioning error).

It should be noted that image fields 1314 are arranged on a hexagonal grid because the solid angle covered by the array is not large enough to require an icosahedral geodesic packing.

FIG. 20B depicts a detailed view of overlap fields 1316 formed by the overlap of adjacent image portions 1314.

Refractive multiscale telescopic imaging systems afford some advantages over reflective multiscale telescopic imaging systems. First, aberrations to the optical path delay due to glass inhomogeneity that could be tolerated increases in proportion to scale (as long as the resolution of the system remains constant). Second, a refractive multiscale telescopic imaging system avoids the obscuration issues described above. As a result, a refractive multiscale telescopic imaging system can increased etendue over a refractive multiscale telescopic imaging system having the same entrance pupil diameter. Third, microcameras are easier to mount in a refractive multiscale telescopic imaging system, since there is no need to consider obscurations.

One skilled in the art will recognize that an important consideration for any imaging system is etendue. For some embodiments of the present invention, increasing etendue requires scaling the diameter of the entrance pupil and therefore the overall size of the optical system, including the scale of all elements of the objective, microcamera, and the focal-plane array. Since the mass of the optical system scales with the scale cubed, the cost of the optics for a refractive multiscale telescopic imaging system can increase rapidly with increasing scale. Furthermore, it is challenging to fabricate a monocentric refractive objective lens larger than objective lens 1302. The lens elements that compose objective lens 1302 are formed from glass blanks. Unfortunately, as the thickness of a glass blank increases beyond approximately 300 mm, it is with difficult, if not impossible, to achieve sufficient homogeneity through its bulk.

FIG. 21 depicts a schematic drawing of a cross-sectional view of a multiscale telescopic imaging system in accordance with a third alternative embodiment of the present invention. System 2100 comprises objective lens 2102 and microcamera array 2104. System 2100 is analogous to system 1300; however, objective lens 2102 is not a monocentric objective lens and, therefore, avoids the thickness limitation for glass blanks described above. System 2100 has an instantaneous field of view of 25 degrees (i.e., θ7 is equal to 12.5°).

Objective lens 2102 is a refractive lens based on a double-gauss lens design. The elements of objective lens 2102 are limited to less than 150 mm in diameter and less than 4 mm in thickness. Objective lens 2102, therefore, can be readily fabricated using conventional commercially available glass blanks. Table 10, provided in Appendix A, provides a prescription for objective lens 2102. For the purposes of illustration herein, the materials designated in Tables 10 and 11 are commercially available materials from OHARA glass.

Objective lens 2102 is substantially symmetric about a central stop; therefore, the lens is substantially coma- and lateral-chromatic-aberration-free. As a result, in similar fashion to a monocentric objective lenses 202 and 1302, residual aberrations in intermediate image 2108 are substantially limited to spherical aberration, axial chromatic aberration, and curvature of field.

FIGS. 22A-E depicts ray fans for five field positions within intermediate image 2108. Plots 2200, 2202, 2204, 2206, and 2208 show ray fans for field angles of 0, 5, 10, 15, and 18 degrees, respectively. It can be seen from the plots that the aberrations are substantially invariant with field angle. Further, the aberrations are odd-symmetric, which is consistent with spherical aberration. It should be noted that the center of intermediate image 2108 does not coincide with the stop placement, although this image surface is spherical.

Figure 23:
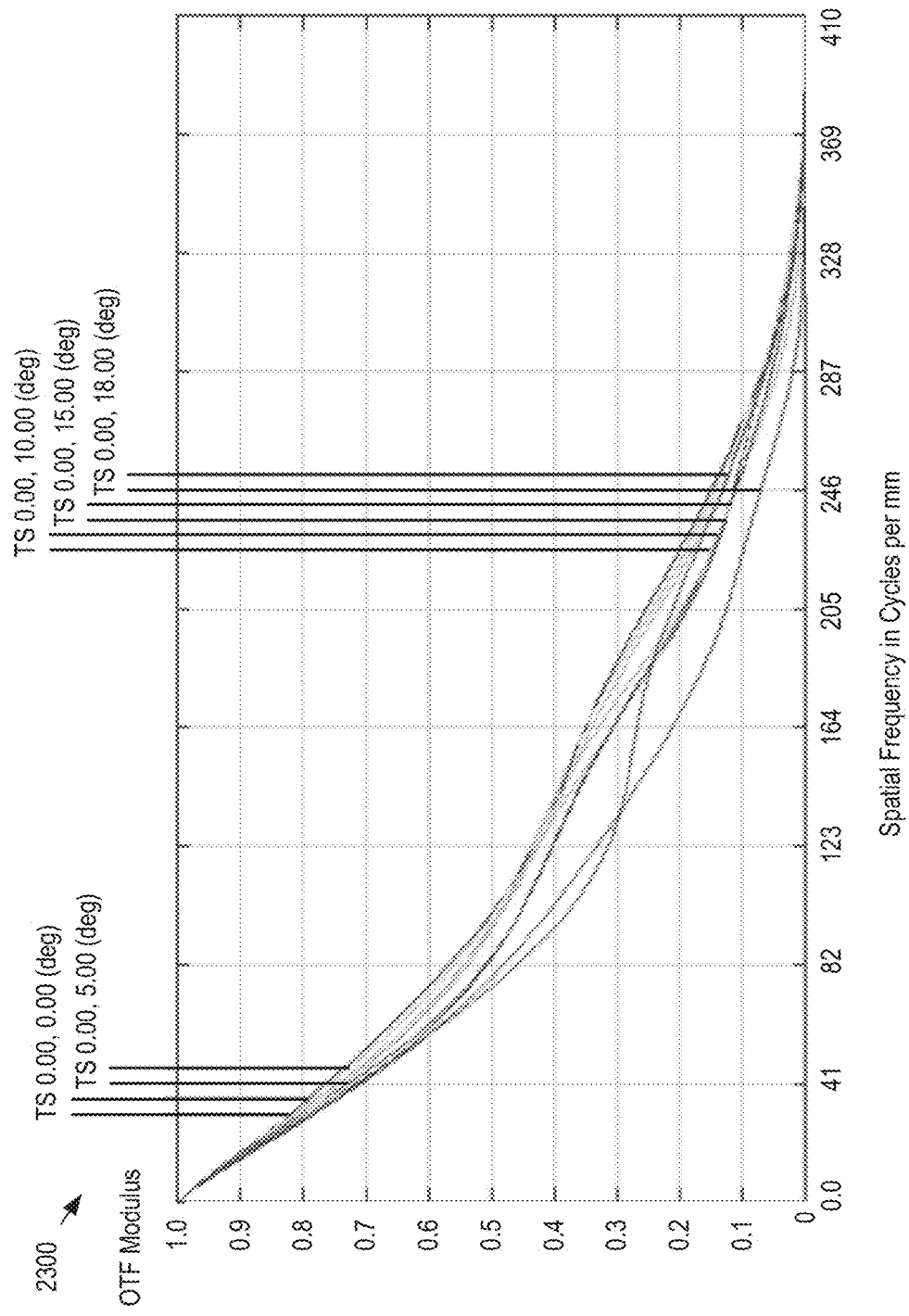
FIG. 23 depicts the modulation transfer function of objective lens 2102 as a function of field position.

FIG. 23 depicts the modulation transfer function of objective lens 2102 as a function of field position.

It is an aspect of the present invention that the design of objective lens 2102 ensures that the chief ray is perpendicular to intermediate image 2108 along is curved image surface. This is in similar fashion to the monocentric multiscale telescopic imaging systems described above. By ensuring this relationship, image rays enter each of microcameras 2110 at substantially normal incidence, which mitigates vignetting in the microcameras.

Figure 24:
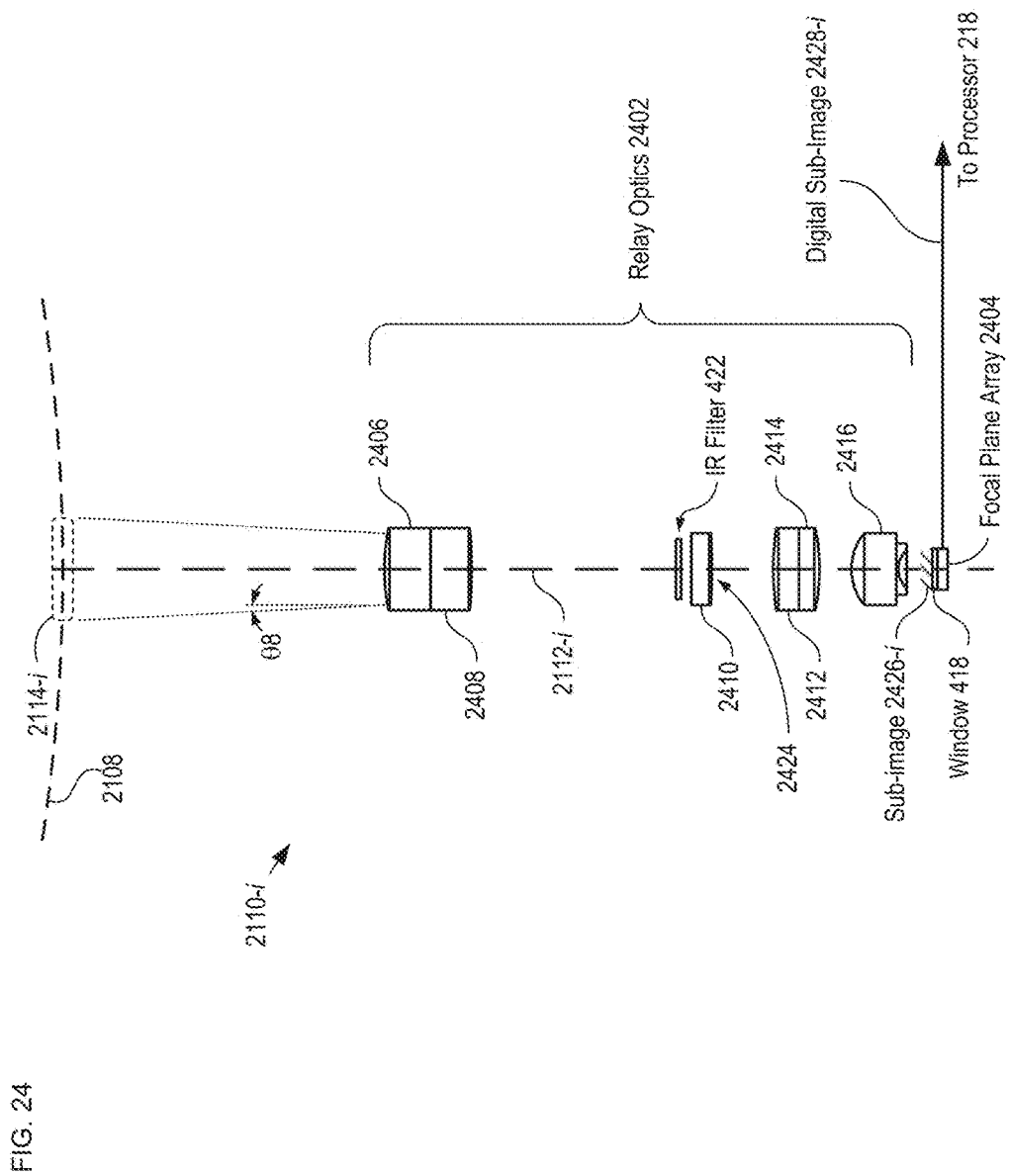
FIG. 24 depicts a microcamera in accordance with the third alternative embodiment of the present invention.

FIG. 24 depicts a microcamera in accordance with the third alternative embodiment of the present invention. Microcamera 2110-*i* comprises relay optics 2402 and focal-plane array 2404. Microcamera 2110-*i* is analogous to microcamera 1310-*i*, described above and with respect to FIGS. 13 and 15. A prescription for microcamera 2110-*i* is provided in Table 11, found in Appendix A. Microcamera 2110-*i* has a cone angle of approximately 1.386° (i.e., θ8 is 0.693°) and can image out to a maximum of 1 degree off axis. Lens elements included in relay optics 2402 comprise plastic materials (e.g., Zeonex E48R and Osaka Gas Chemicals OKP4), although it will be clear to one skilled in the art, after reading this Specification, how to specify, make, and use one or more glass elements in microcamera 2110-*i*.

The track length of objective lens 2102 is approximately 480 mm and microcamera 2110-*i* has a track length of approximately 108 mm. Each microcamera telescope has a IFOV of 9 microrads.

Focal plane array 2404 includes a two-dimensional array of 1.4-micron pixel elements, providing system 2100 with approximately 2.5 gigapixels of resolution.

Figure 25A:
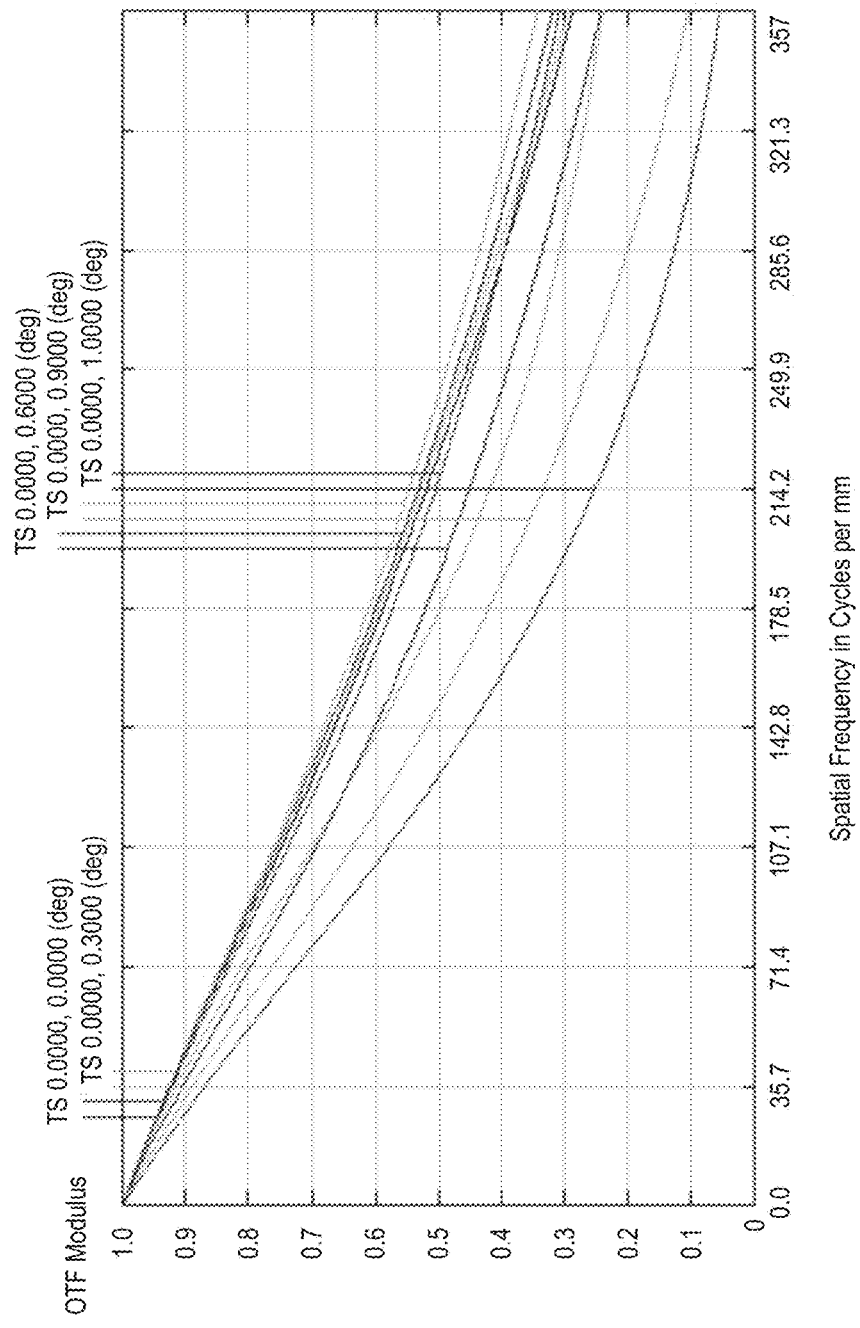
FIGS. 25A and 25B depict modulation transfer functions for system 2100 with a microcamera on-axis and off axis, respectively.
Figure 25B:
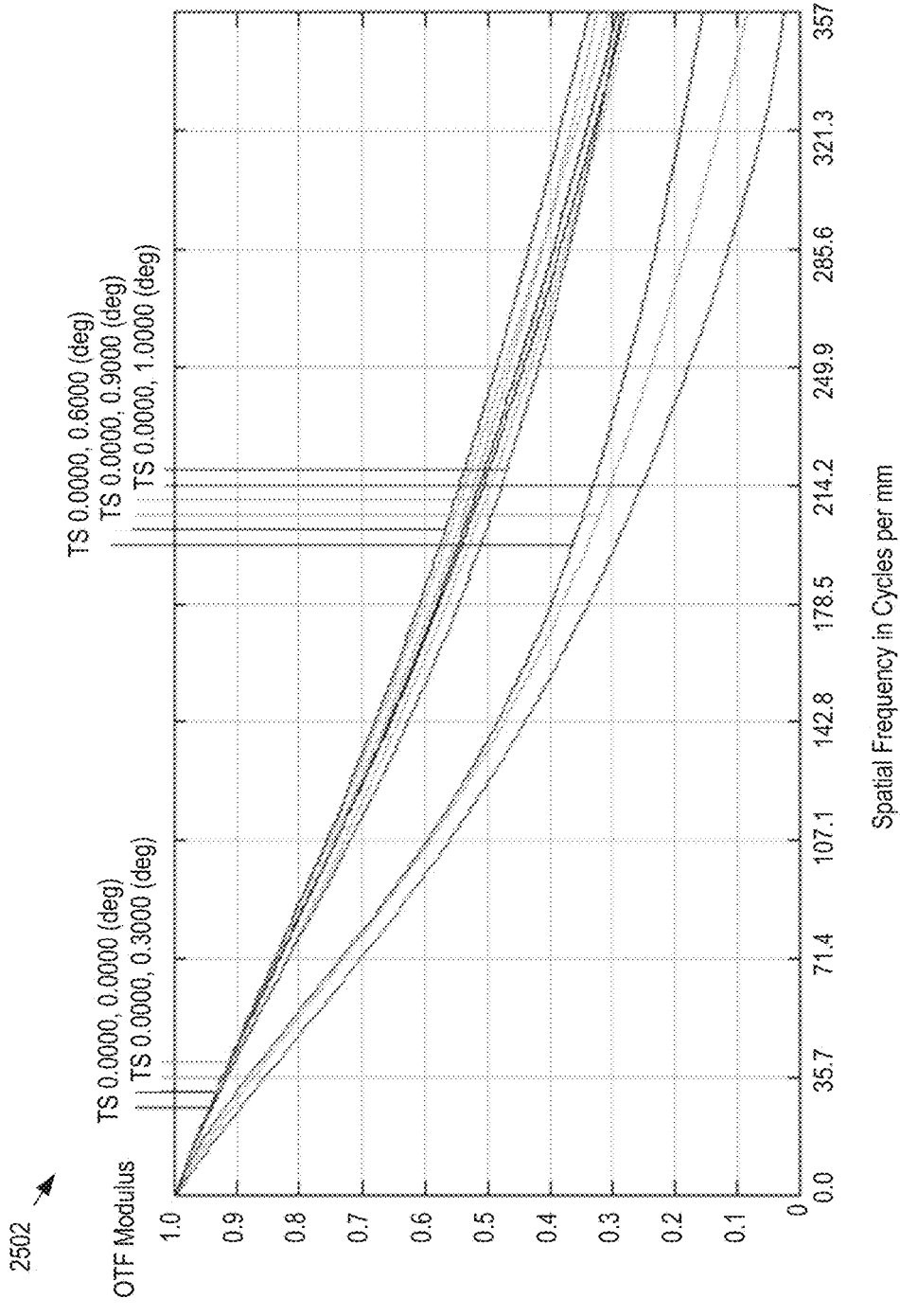

FIGS. 25A and 25B depict modulation transfer functions for system 2100 with a microcamera on-axis and off axis, respectively. Plot 2500 shows the modulation transfer function for system 2100 with microcamera 2110-*i* on-axis. Plot 2502 shows the modulation transfer function for system 2100 with microcamera 2110-*i* off-axis by 8°.

FIGS. 26A and 26B depict the field curvature and distortion, respectively, of sub-image 2426-*i* at focal plane array 2404.

Figure 27:
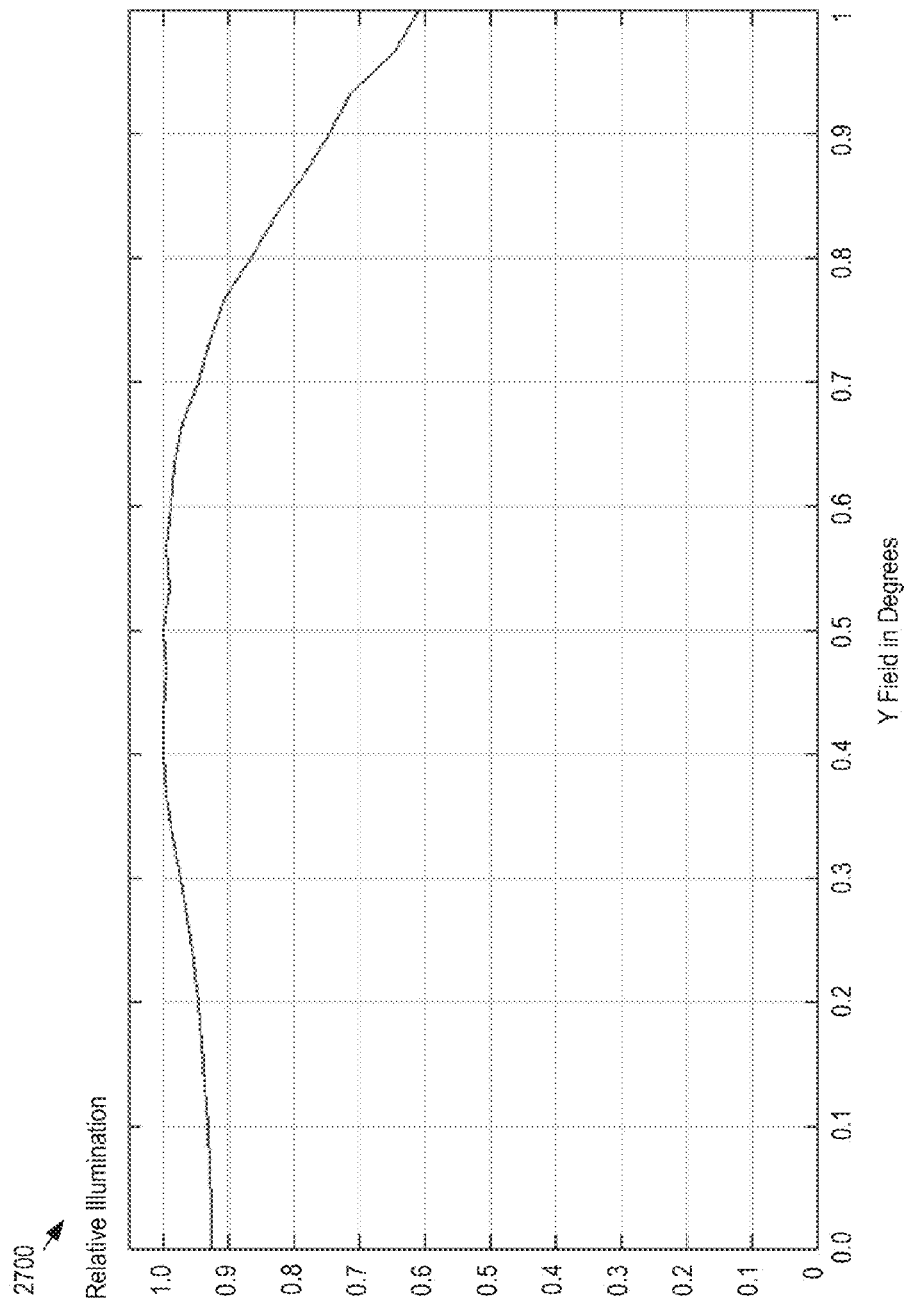
FIG. 27 depicts the relative illumination of sub-image 2426-$i$.

FIG. 27 depicts the relative illumination of sub-image 2426-*i*. Plot 2700 shows that illumination is substantially uniform except at the edge (i.e., in overlap regions 2116), where its light is divided among adjacent microcameras.

Figure 28:
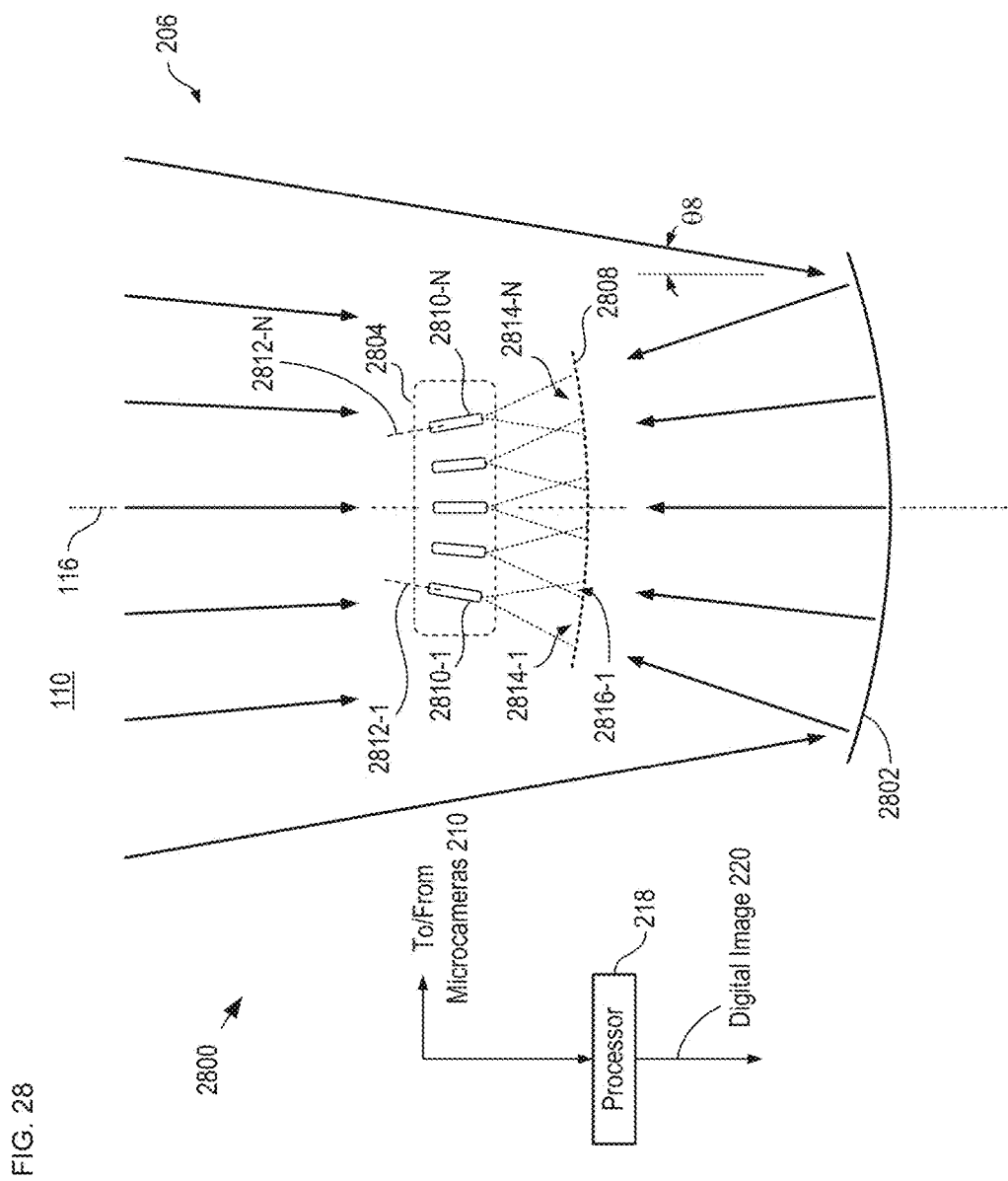
FIG. 28 depicts a schematic drawing of a cross-sectional view of a multiscale telescopic imaging system in accordance with a fourth alternative embodiment of the present invention.

FIG. 28 depicts a schematic drawing of a cross-sectional view of a multiscale telescopic imaging system in accordance with a fourth alternative embodiment of the present invention. System 2800 is a catadioptric imaging system that comprises objective lens 2802 and microcamera array 2804. System 2800 is analogous to system 200. System 2800 has an instantaneous field of view of 15 degrees (i.e., θ8 is equal to) 7.5° and 1.1 arcsec resolution. A prescription for system 2810 is provided in Table 12 in Appendix A. System 2800 is designed for operation at wavelengths within the range of approximately 486 nm to approximately 656 nm.

Objective lens 2802 is a reflective lens having a substantially spherical shape. Objective lens 2802 has a radius of 3048 mm and a diameter of 762 mm (f/2). Its field of view is approximately 15°.

Microcamera array 2804 includes 88 substantially identical microcameras 2810-1 through 2810-N (where N=88), which operate as the equivalent of 88 200-mm individual telescopes.

Figure 29:
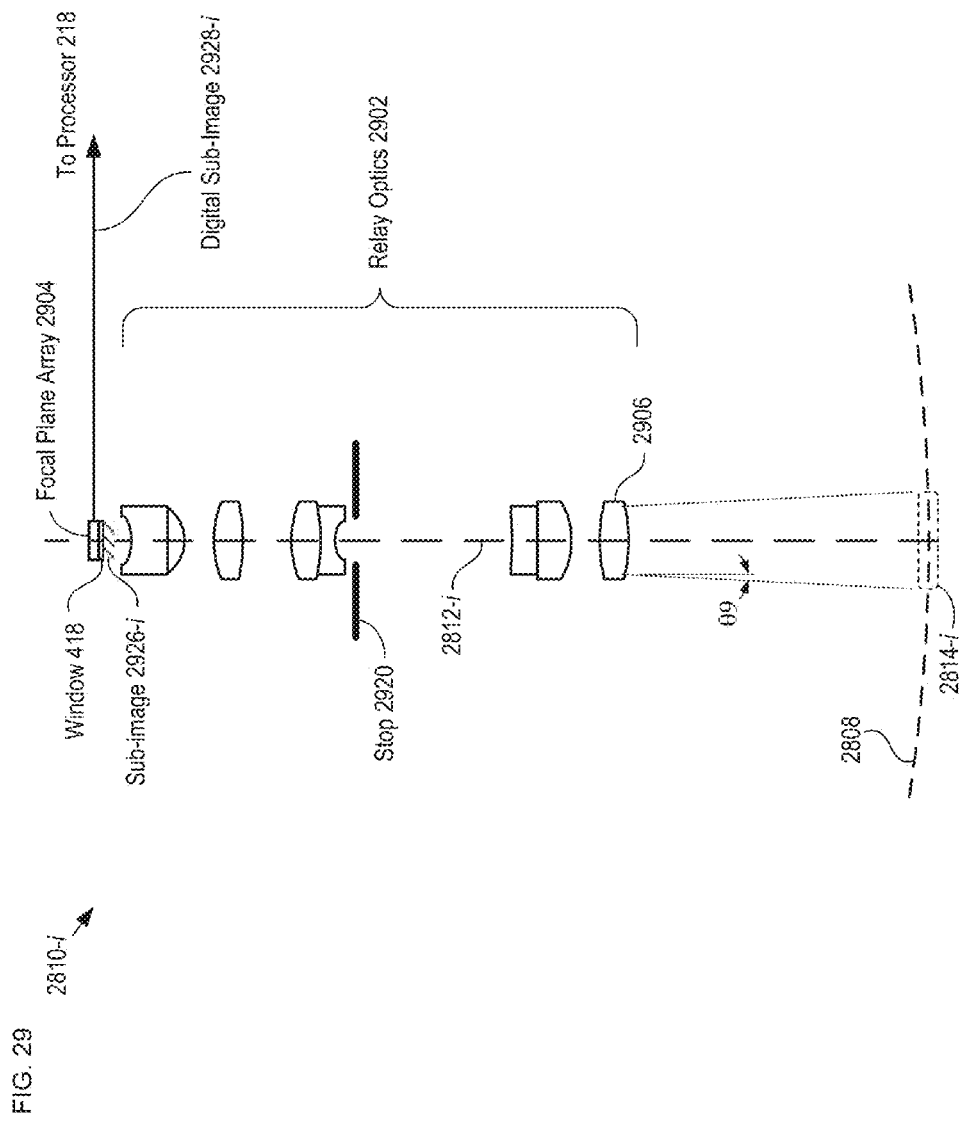
FIG. 29 depicts a microcamera in accordance with the fourth alternative embodiment of the present invention.

FIG. 29 depicts a microcamera in accordance with the fourth alternative embodiment of the present invention. Microcamera 2810-*i* is a double-gauss design that comprises relay optics 2902 and focal-plane array 2904. Microcamera 2810-*i* is analogous to microcamera 210-*i*, described above and with respect to FIG. 4. Microcamera 2810-*i* has a cone angle of approximately 0.6° (i.e., θ9 is equal to 0.3°).

Relay optics 2902 are based on a Double Gauss design that is modified to relay at finite conjugates and includes entrance lens 2906, which is designed to prevent rays from vignetting into the system.

The f/# at focal-plane array 2904 is 2.25, and the rays are image-side telecentric and so the chief ray angle is normal to focal-plane array 2904. The rear two elements are movable along microcamera axis 2812-*i* to enable refocus of microcamera 2810-*i*. As discussed above, dynamic focus capability for the microcameras of a multiscale telescopic imaging system enables compensation for thermal variations, as well as manufacturing tolerances; however, the telecentricity of microcamera 2810-*i* ensures the same magnification through the focus range.

Focal-plane array 2904 comprises a two-dimensional array of image pixels that are within the range of approximately 1.5 microns to 2.2 microns in size. Typically, focal-plane array 2904 includes approximately 5 megapixels. In some embodiments, focal-plane array 2904 includes 14 megapixels in 2×2 binning mode. The instantaneous field of view of system 2800 is given by the pixel size of the focal-plane array 2904 divided by the effective focal length of the system 2800 as determined by the combination of objective lens 2802 and microcamera 2804, which should be equal to the desired sampling of the image of 1.1 arcseconds (equivalently 5.33 microradians).

Objective lens 2802 images scene 110 at intermediate image 2808. The 15° field of view allows for segmentation of intermediate image 2808 into 176 separate fields of view—each having a diameter of approximately 0.48°. As mentioned above, each microcamera in microcamera array 2804 has a field of view of approximately 0.6, which enables the microcameras to be spaced apart by 0.48° but yields overlap regions 2816 that contain between 10% and 25% of adjacent image portions 2814. As a result, the 88 microcameras can be arranged in a sparse arrangement (e.g., half filled) to provide open regions between them. These open regions enable light from scene 110 to reach objective lens 2802, yet the microcameras collectively relay the entire intermediate image onto their focal-plane arrays. Further, it also enables overlap of adjacent image portions 2814 to create overlap regions 2816, which affords advantages to system 2800, as discussed above. It should be noted that the telecentricity of microcameras 2810 ensures that overlap regions 2816 contain the same image points as the focus of one or more of the microcameras is changed.

Figure 30:
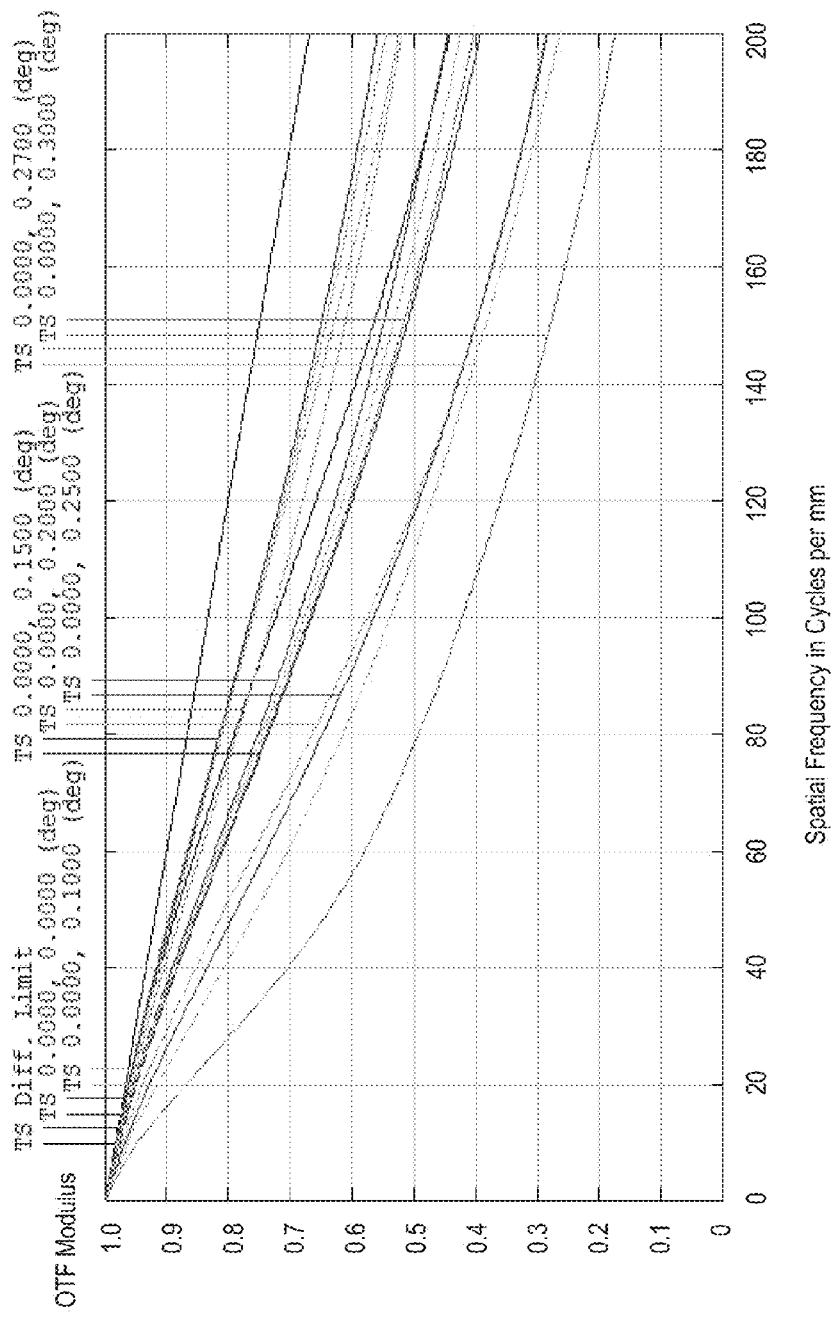
FIG. 30 depicts a modulation transfer function of an image portion 2814.

FIG. 30 depicts a modulation transfer function of an image portion 2814. Plot 3000 shows that good optical performance is maintained out to the edge of image portion 2814, where it becomes an overlap region 2816, where another microcamera can form a higher-quality image.

FIGS. 31A-D depict Monte Carlo simulations of the performance of system 2800 under realistic manufacturing conditions. The assumptions for component and manufacturing tolerances for the simulations are ±25-micron surface and element decenter, ±50-micron element thickness and axial placement, and 0.1° surface and element tilt.

Plots 3102, 3104, 3106, and 3108 show the Monte Carlo MTF, maintaining the performance at 200 cycles/mm.

Given the large number of components in each of the multiscale telescopic imaging systems described herein, manufacturability is important as is amenability to mass production techniques. For astronomical applications of system 2800, the estimated limiting magnitude of each image portion 2814 is estimated to be 19.7 (assuming a 300 second exposure period of 30 stacked 10-second exposures with 15 photoelectrons noise per acquired image). Since the field of view of system 2800 is 15°, parts of the field may be exposed up to 3600 seconds, allowing the magnitude to 21. Further, near-Earth objects can be found by stacking partial exposures at the non-sidereal rate.

It is expected that the entire night sky could be monitored continuously by a world-wide network of multiscale telescopic imaging systems directed near the zenith. This would require approximately 480 copies of system 2800, for example, which would be the equivalent of 42,240 eight-inch telescopes or 144 gigapixels. A simple equatorial platform clock-drive mechanism would suffice for sidereal tracking, greatly simplifying mounting. Furthermore, as microcamera designs continue to improve, the modular multiscale design enables straight-forward system upgrades, so improvements could leverage existing infrastructure.

It is to be understood that the disclosure teaches just one example of the illustrative embodiment and that many variations of the invention can easily be devised by those skilled in the art after reading this disclosure and that the scope of the present invention is to be determined by the following claims.

APPENDIX A

TABLE 1

Prescription for microcamera 210.

| Surface # | Radius R (mm) | Thickness (mm) | Material | Diameter (mm) | Comment |
|---|---|---|---|---|---|
| 1 | 26.63415 | 3 | E48R | 9.6 | Microcamera start, Aspheric Surface |
| 2 | −22.69573 | 3 | OKP4 | 9.6 | |
| 3 | −59.18699 | 22 | | 9.6 | Aspheric Surface |
| 4 | ∞ | 0.5 | N-BK7 | 6.965157 | Stop, IR cut filter |
| 5 | ∞ | 1 | | 8.004592 | |
| 6 | 200 | 2 | E48R | 8.134189 | Lens 410 |
| 7 | −50 | 10.00982 | | 8.272826 | Diffractive surface |
| 8 | 53.41197 | 2.5 | OKP4 | 9.819086 | Focusing element Lenses 412, 414 |
| 9 | 10.48588 | 3.5 | E48R | 10.0174 | |
| 10 | −26.70599 | 4 | | 10.24507 | |
| 11 | 7.257348 | 9 | E48R | 10.16389 | Aspheric Surface (L6) |
| 12 | 4.269028 | 2 | | 5.997253 | Microcamera End, Aspheric Surface |
| 13 | ∞ | 0.4 | N-BK7 | 5.74972 | Sensor window |
| 14 | ∞ | 0.1 | | 5.698356 | |
| 15 | ∞ | | | 4.680515 | Image plane |

TABLE 2

Aspheric coefficients for the prescription for microcamera 210 (Table 1 above).

| Surface # | $a_2 r^4$ coefficient (mm$^{-3}$) | $a_3 r^6$ coefficient (mm$^{-5}$) | $a_2 r^8$ coefficient (mm$^{-7}$) | $a_2 r^{10}$ coefficient (mm$^{-9}$) |
|---|---|---|---|---|
| 1 | $-1.6886523 \times 10^{-5}$ | $1.7786764 \times 10^{-6}$ | $-8.9893941 \times 10^{-8}$ | $1.553034 \times 10^{-9}$ |
| 3 | $2.2745659 \times 10^{-5}$ | $-1.2045343 \times 10^{-7}$ | $2.9732628 \times 10^{-9}$ | 0 |
| 11 | $-8.219397 \times 10^{-5}$ | $-1.5610208 \times 10^{-6}$ | $1.9589715 \times 10^{-10}$ | 0 |
| 12 | −0.00097436575 | −0.00015217878 | 0 | 0 |

TABLE 3

Diffractive phase profile coefficients for diffractive surface 424.

| Surface # | $a_1 r^2$ coefficient (mm$^{-2}$) | $a_2 r^4$ coefficient (mm$^{-4}$) | $a_3 r^6$ coefficient (mm$^{-6}$) |
|---|---|---|---|
| 7 | −57181.552 | 3732654.7 | $2.9919161 \times 10^9$ |

TABLE 4

Prescription for system 900.

| Surface # | Radius (mm) | Thickness (mm) | Material | Diameter (mm) | Comment |
|---|---|---|---|---|---|
| 1 | ∞ | ∞ | | 0 | Object |
| 2 | ∞ | −5 | N-BK7 | 150 | Schmidt corrector plate, Aspheric Surface |
| 3 | ∞ | −1196.725 | | 150 | |
| 4 | 1200 | 600 | MIRROR | 358 | Spherical primary mirror |
| 5 | 598.464 | 40 | | 104 | Intermediate image surface |
| 6 | 26.54865 | 3 | E48R | 9.6 | Microcamera start, Aspheric Surface (Lenses 406, 408) |
| 7 | −22.47182 | 3 | OKP4 | 9.6 | |
| 8 | −58.99699 | 22 | | 9.6 | Aspheric Surface |
| 9 | ∞ | 0.5 | N-BK7 | 6.967818 | Stop, IR cut filter |
| 10 | ∞ | 1 | | 8.007911 | |
| 11 | 200 | 2 | E48R | 8.139009 | Lens 410 |
| 12 | −50 | 9.869349 | | 8.28092 | Diffractive Surface |
| 13 | 53.40306 | 2.5 | OKP4 | 9.817042 | Focusing element (Lenses 412, 414) |
| 14 | 10.54498 | 3.5 | E48R | 10.01713 | |
| 15 | −26.70153 | 4 | | 10.24834 | |
| 16 | 7.377223 | 9 | E48R | 10.17653 | Aspheric Surface (Lens 416) |
| 17 | 4.339543 | 2 | | 5.978056 | Microcamera End, Aspheric Surface |
| 18 | ∞ | 0.4 | N-BK7 | 5.745812 | Sensor window |
| 19 | ∞ | 0.1 | | 5.697902 | |
| 20 | ∞ | | | 4.681273 | Image plane |

TABLE 5

Aspheric coefficients of the prescription for system 900.

| Surface # | $a_2 r^4$ coefficient (mm$^{-3}$) | $a_3 r^6$ coefficient (mm$^{-5}$) | $a_2 r^8$ coefficient (mm$^{-7}$) | $a_2 r^{10}$ coefficient (mm$^{-9}$) |
|---|---|---|---|---|
| 1 | $2.69 \times 10^{-10}$ | $2.005 \times 10^{-15}$ | $-1.492 \times 10^{-19}$ | 0 |
| 6 | $-3.0537948 \times 10^{-5}$ | $1.5739492 \times 10^{-6}$ | $-1.0680456 \times 10^{-7}$ | $2.0248597 \times 10^{-9}$ |
| 8 | $1.3621198 \times 10^{-5}$ | $-7.4489343 \times 10^{-7}$ | $9.4868098 \times 10^{-9}$ | 0 |
| 16 | $-3.7950446 \times 10^{-5}$ | $-9.0816072 \times 10^{-7}$ | $9.3362672 \times 10^{-9}$ | 0 |
| 17 | −0.00088357931 | $-9.2151543 \times 10^{-5}$ | 0 | 0 |

TABLE 6

Diffractive phase profile coefficients for diffractive surface 424 in system 900.

| Surface # | $a_1 r^2$ coefficient (mm$^{-2}$) | $a_2 r^4$ coefficient (mm$^{-4}$) | $a_3 r^6$ coefficient (mm$^{-6}$) |
|---|---|---|---|
| 12 | −54883.335 | 2865723.7 | $1.7517389 \times 10^9$ |

TABLE 7

Prescription for system 1300.

| Surface # | Radius (mm) | Thickness (mm) | Material | Diameter (mm) | Comment |
|---|---|---|---|---|---|
| 1 | ∞ | ∞ | | 0 | Object |
| 2 | 360 | 217.243 | LF5 | 543.826 | Objective start |
| 3 | 142.757 | 142.757 | N-BK7 | 241.668 | |
| 4 | ∞ | 142.757 | N-BK7 | 241.668 | |
| 5 | −142.757 | 232.121 | LF5 | 229.566 | |
| 6 | −374.878 | 240.397 | | 518.064 | Objective end |
| 7 | −615.275 | 40 | | 13.41169 | Intermediate image surface |

TABLE 7-continued

Prescription for system 1300.

| Surface # | Radius (mm) | Thickness (mm) | Material | Diameter (mm) | Comment |
|---|---|---|---|---|---|
| 8 | 27.74976 | 5 | E48R | 9.6 | Microcamera start, Aspheric Surface (Lenses 1406 and 1408) |
| 9 | −88.49545 | 5 | OKP4 | 9.6 | |
| 10 | −61.66614 | 26.32681 | | 9.6 | Aspheric Surface |
| 11 | ∞ | 0.5 | N-BK7 | 6.657188 | Stop, IR cut filter |
| 12 | ∞ | 1 | | 7.721244 | |
| 13 | 200 | 2 | E48R | 7.949465 | (Lens 1410) |
| 14 | −50 | 9.705121 | | 8.207923 | Diffractive surface |
| 15 | 48.58209 | 2.5 | OKP4 | 9.840211 | Focusing element (Lenses 1412 and 1414) |
| 16 | −55.33565 | 2.5 | E48R | 9.930473 | |
| 17 | −24.29105 | 4 | | 10.01174 | |
| 18 | 7.573737 | 6 | OKP4 | 9.17504 | Aspheric Surface (Lens 1416) |
| 19 | 4.455139 | 2 | | 6.143487 | Microcamera end, Aspheric Surface |
| 20 | ∞ | 0.4 | N-BK7 | 5.801741 | Sensor window |
| 21 | ∞ | 0.1 | | 5.728899 | |
| 22 | ∞ | | | 4.706103 | Image plane |

TABLE 8

Aspheric coefficients of the prescription for system 1400.

| Surface # | $a_2 r^4$ coefficient ($mm^{-3}$) | $a_3 r^6$ coefficient ($mm^{-5}$) | $a_2 r^8$ coefficient ($mm^{-7}$) | $a_2 r^{10}$ coefficient ($mm^{-9}$) |
|---|---|---|---|---|
| 8 | $5.1324798 \times 10^{-5}$ | $-4.3508909 \times 10^{-6}$ | $1.8669263 \times 10^{-7}$ | $-3.5385648 \times 10^{-9}$ |
| 10 | $5.9766855 \times 10^{-5}$ | $-2.4961897 \times 10^{-6}$ | $4.532904 \times 10^{-8}$ | 0 |
| 18 | 0.00016230789 | $-1.5147864 \times 10^{-5}$ | $2.263225 \times 10^{-7}$ | 0 |
| 19 | 0.0031378482 | −0.00062506022 | 0 | 0 |

TABLE 9

Diffractive phase profile coefficients for diffractive surface 1424 in system 1400.

| Surface # | $a_1 r^2$ coefficient ($mm^{-2}$) | $a_2 r^4$ coefficient ($mm^{-4}$) | $a_3 r^6$ coefficient ($mm^{-6}$) |
|---|---|---|---|
| 14 | −322040.42 | 30853610 | $-3.483994 \times 10^9$ |

TABLE 10

Prescription for objective 2102.

| Surface # | Radius (mm) | Thickness (mm) | Material | Diameter (mm) | Comment |
|---|---|---|---|---|---|
| 1 | ∞ | 97.951 | | 92.86516 | |
| 2 | — | 0 | | — | |
| 3 | ∞ | −97.951 | | 95.92794 | |
| 4 | — | 0 | | — | |
| 5 | 156.123 | 27.482 | S-BSM15 | 129.776 | Objective |
| 6 | 256.231 | 9.426 | | 114.898 | |
| 7 | — | 0 | | — | |
| 8 | 463.834 | 14 | S-BSM15 | 109.12 | |
| 9 | 80.073 | 18 | S-FPL51 | 92.502 | |
| 10 | ∞ | 34.132 | | 82.63025 | |
| 11 | ∞ | 62.611 | | 76 | |
| 12 | ∞ | 18 | S-FPL51 | 101.68 | |
| 13 | −116.086 | 16.694 | S-LAM60 | 104.204 | |
| 14 | −347.157 | 29.141 | S-BSM15 | 116.272 | |
| 15 | −175.677 | 250.924 | | 128.044 | |
| 16 | ∞ | −381.459 | | 13.88646 | |

TABLE 10-continued

Prescription for objective 2102.

| Surface # | Radius (mm) | Thickness (mm) | Material | Diameter (mm) | Comment |
|---|---|---|---|---|---|
| 17 | — | 381.459 | | — | |
| 18 | ∞ | 40 | | 0 | |
| 19 | — | 0 | | — | |
| 20 | ∞ | 0 | | 10.54326 | |

TABLE 11

Prescription for microcamera 2110 (surfaces are numbered within system 2100).

| Surface # | Radius (mm) | Thickness (mm) | Material | Diameter (mm) | Comment |
|---|---|---|---|---|---|
| 21 | 30.14496 | 3 | E48R | 10.2 | Microcamera |
| 22 | ∞ | 0 | E48R | 10.2 | |
| 23 | −31.41865 | 3 | OKP4 | 10.2 | |
| 24 | −66.98881 | 22.396 | | 10.2 | |
| 25 | ∞ | 0.5 | S-BSL7 | 8.113239 | |
| 26 | ∞ | 1 | | 8.085878 | |
| STO | 200 | 3 | E48R | 7 | |
| 28 | −50 | 13 | | 8.312635 | Stop |
| 29 | ∞ | 0 | | 9.478867 | |
| 30 | ∞ | 0 | | 9.478867 | |
| 31 | 59.53304 | 3 | OKP4 | 9.507213 | |
| 32 | ∞ | 0 | OKP4 | 9.679415 | |
| 33 | 19.10577 | 4 | E48R | 9.72629 | |

TABLE 11-continued

Prescription for microcamera 2110 (surfaces are numbered within system 2100).

| Surface # | Radius (mm) | Thickness (mm) | Material | Diameter (mm) | Comment |
|---|---|---|---|---|---|
| 34 | ∞ | 0 | E48R | 10.0808 | |
| 35 | −29.76652 | 4 | | 10.04253 | |
| 36 | ∞ | 0 | | 10.17668 | |
| 37 | ∞ | 0 | | 10.17668 | |
| 38 | 7.612243 | 10 | E48R | 10.23967 | |
| 39 | ∞ | 0 | E48R | 6.234178 | |
| 40 | 4.229024 | 1.75 | | 5.943628 | |
| 41 | ∞ | 0 | | 5.657099 | |
| 42 | ∞ | 0 | | 5.657099 | |
| 43 | ∞ | 0.4 | S-BSL7 | 5.657099 | |
| 44 | ∞ | 0.1 | | 5.591093 | |
| IMA | ∞ | | | 4.572603 | |

TABLE 12a

Prescription for system 2800 (based on materials available from OHARA).

| Surface # | Radius (mm) | Thickness (mm) | Material | Diameter (mm) | Comment |
|---|---|---|---|---|---|
| 1 | ∞ | ∞ | | | Object Surface |
| 2 | 3048 | 3048 | MIRROR | 762 | Objective Mirror |
| 3 | ∞ | ∞ | | | Intermediate Image Surface |
| 4 | 79.96229 | 79.96229 | S-BAH28 | 11 | Microcamera Start |
| 5 | −79.96229 | −79.96229 | | 11 | |
| 6 | 15.57851 | 15.57851 | S-LAL12 | 11 | |
| 7 | −205.4075 | −205.4075 | S-TIH6 | 10.39214 | |
| 8 | 26.35023 | 26.35023 | | 9.312318 | |
| 9 | ∞ | ∞ | | 4.450593 | Stop |
| 10 | −6.060214 | −6.060214 | S-TIM27 | 6.008102 | |
| 11 | 8.683739 | 8.683739 | S-BSM14 | 7.777471 | |
| 12 | −8.683739 | −8.683739 | | 8.626162 | |
| 13 | 30.16848 | 30.16848 | S-LAL12 | 11.01385 | Focusing Element |
| 14 | −30.16848 | −30.16848 | | 11.14327 | |
| 15 | 8.901399 | 8.901399 | S-BAH28 | 10.77103 | |
| 16 | 6.575486 | 6.575486 | | 6.566129 | Microcamera End |
| 17 | ∞ | ∞ | S-BSL7 | 6.012425 | Sensor Window |
| 18 | ∞ | ∞ | | 6.044184 | |
| 19 | ∞ | ∞ | | 4.4 | Image |

TABLE 12b

Additional prescription information for system 2800.

| Surface # | $N_d$ | $V_d$ |
|---|---|---|
| 1 | | |
| 2 | | |
| 3 | | |
| 4 | 1.723420 | 37.955602 |
| 5 | | |
| 6 | 1.677900 | 55.341195 |
| 7 | 1.805181 | 25.425363 |
| 8 | | |
| 9 | | |
| 10 | 1.639799 | 34.466422 |
| 11 | 1.603112 | 60.641080 |
| 12 | | |
| 13 | 1.677900 | 55.341195 |
| 14 | | |
| 15 | 1.723420 | 37.955602 |
| 16 | | |
| 17 | 1.516330 | 64.142022 |
| 18 | | |
| 19 | | |

What is claimed is:

1. A multiscale telescopic imaging system comprising:
an objective lens, the objective lens being operative for forming a first image of a scene at a first image surface; and
a plurality of microcameras, each microcamera comprising a focal plane array, the plurality of microcameras being operative for relaying a plurality of image portions of the first image onto the plurality of focal plane arrays, wherein the plurality of microcameras is arranged in a first arrangement that enables the plurality of image portions to collectively define a continuous region of the image, and wherein at least one of the plurality of microcameras is operative for reducing the magnitude of a first localized aberration, and further wherein the first arrangement enables at least a partial overlap of a first image portion and a second image portion of the plurality of image portions.

2. The system of claim 1, wherein the system has a field of view that is equal to or greater than 10 degrees, and wherein the system has resolution equal to or less than 2 arcseconds.

3. The system of claim 1, wherein the objective lens comprises a double-gauss refractive lens.

4. The system of claim 1, wherein the objective lens is a reflective lens.

5. The system of claim 1, wherein at least one of the plurality of microcameras includes a paraxial stop.

6. The system of claim 1, wherein at least one of the plurality of microcameras has at least one controllable camera setting that is selected from the group consisting of focus, exposure, gain, magnification, and dynamic range.

7. The system of claim 4, wherein the objective lens comprises a Schmidt corrector plate.

8. The system of claim 1, wherein the objective lens is a refractive lens.

9. The system of claim 8, wherein the first localized aberration is chromatic aberration.

10. The system of claim 1, wherein the objective lens is a monocentric lens.

11. The system of claim 1, wherein the first arrangement defines a first perimeter, and wherein the first arrangement includes a plurality of open regions within the first perimeter, the plurality of open regions being operative for enabling light from the scene to reach the objective lens.

12. The system of claim 11, wherein the first arrangement defines a hexagonal uniformly redundant array.

* * * * *